ABSTRACT OF THE DISCLOSURE

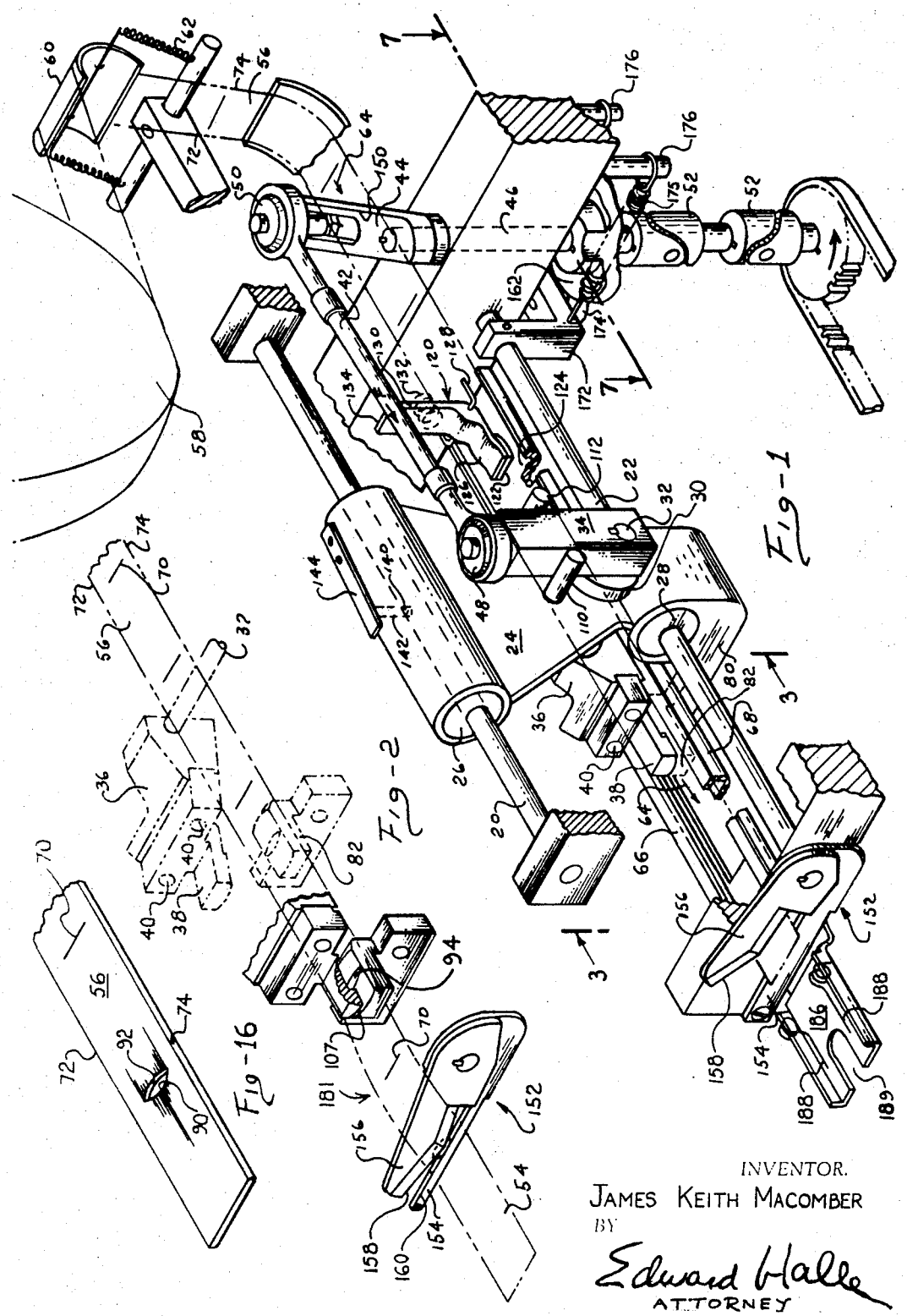

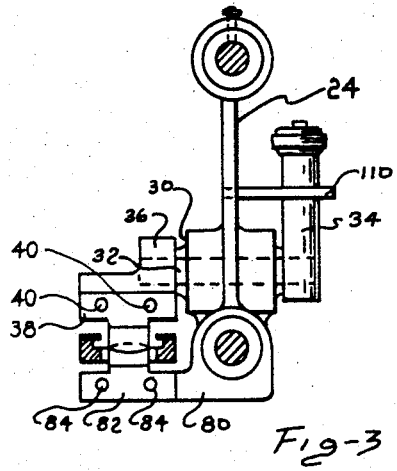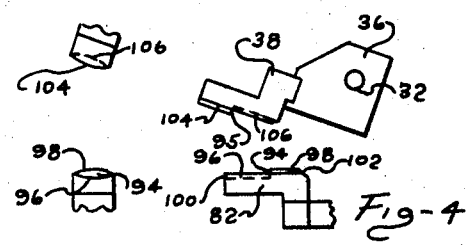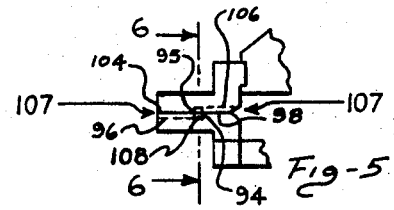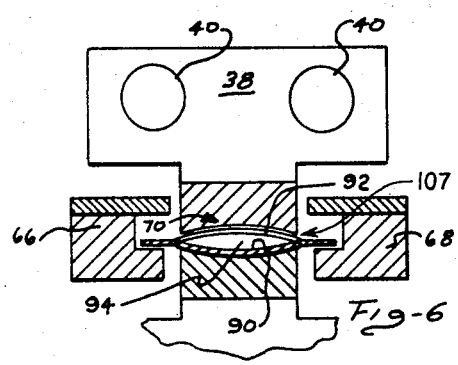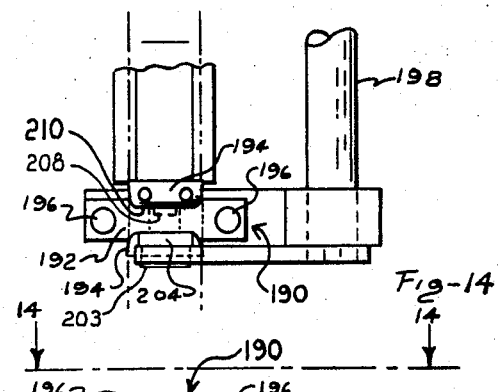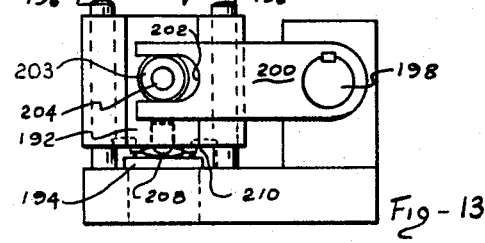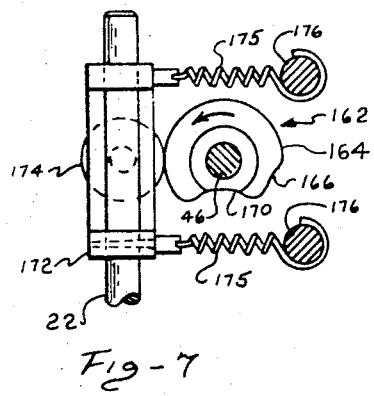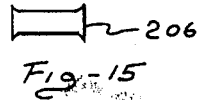

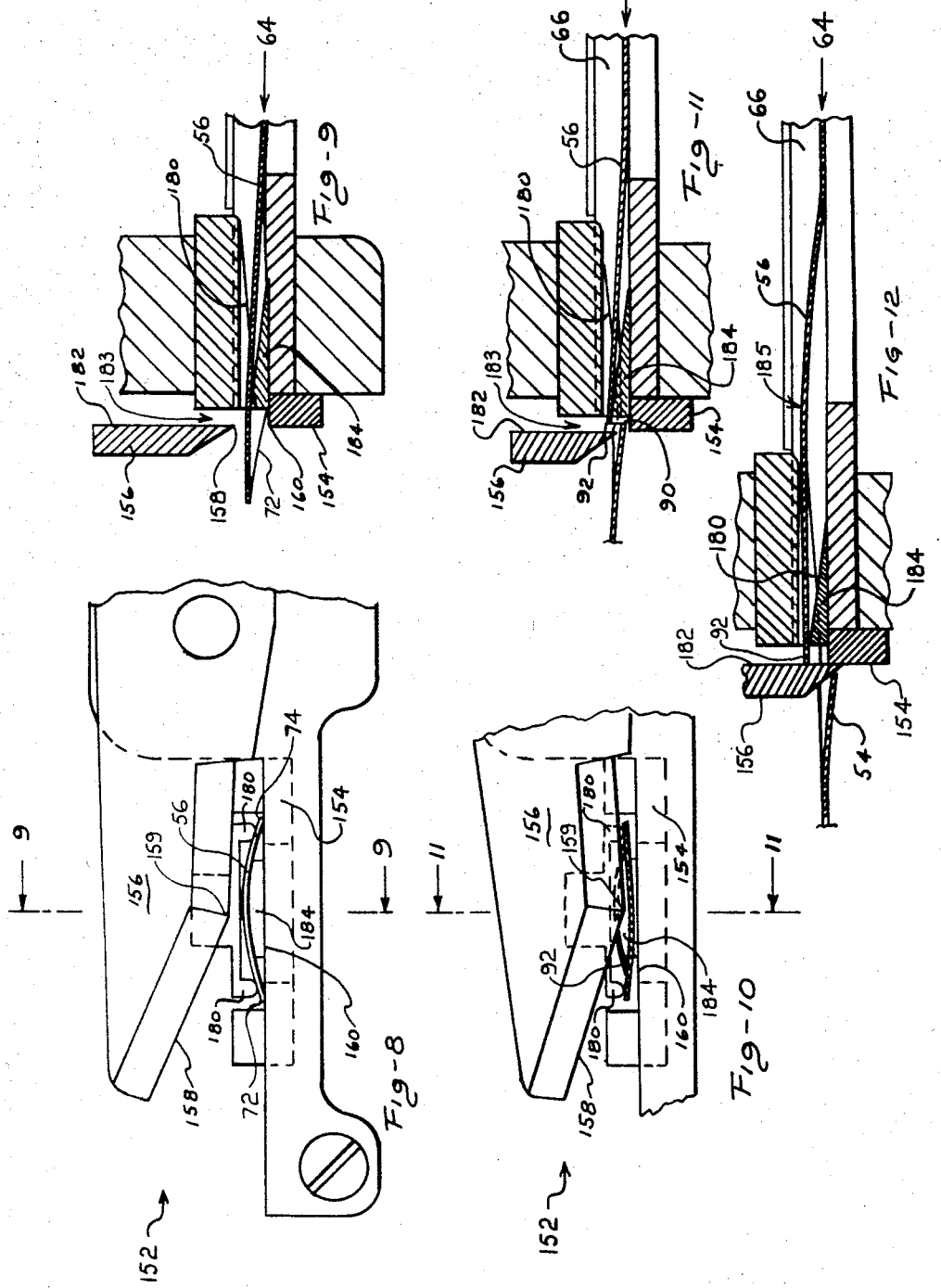

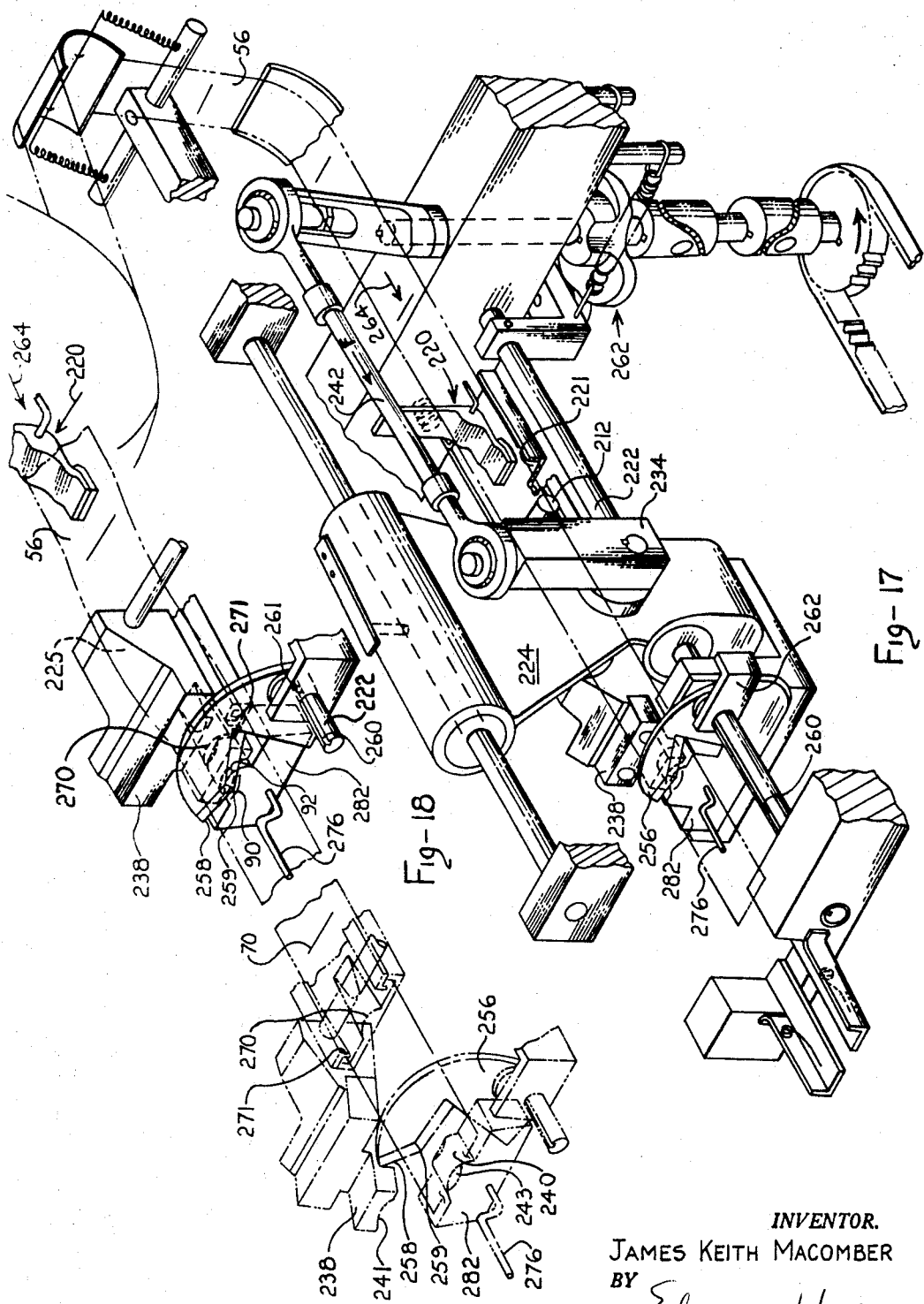

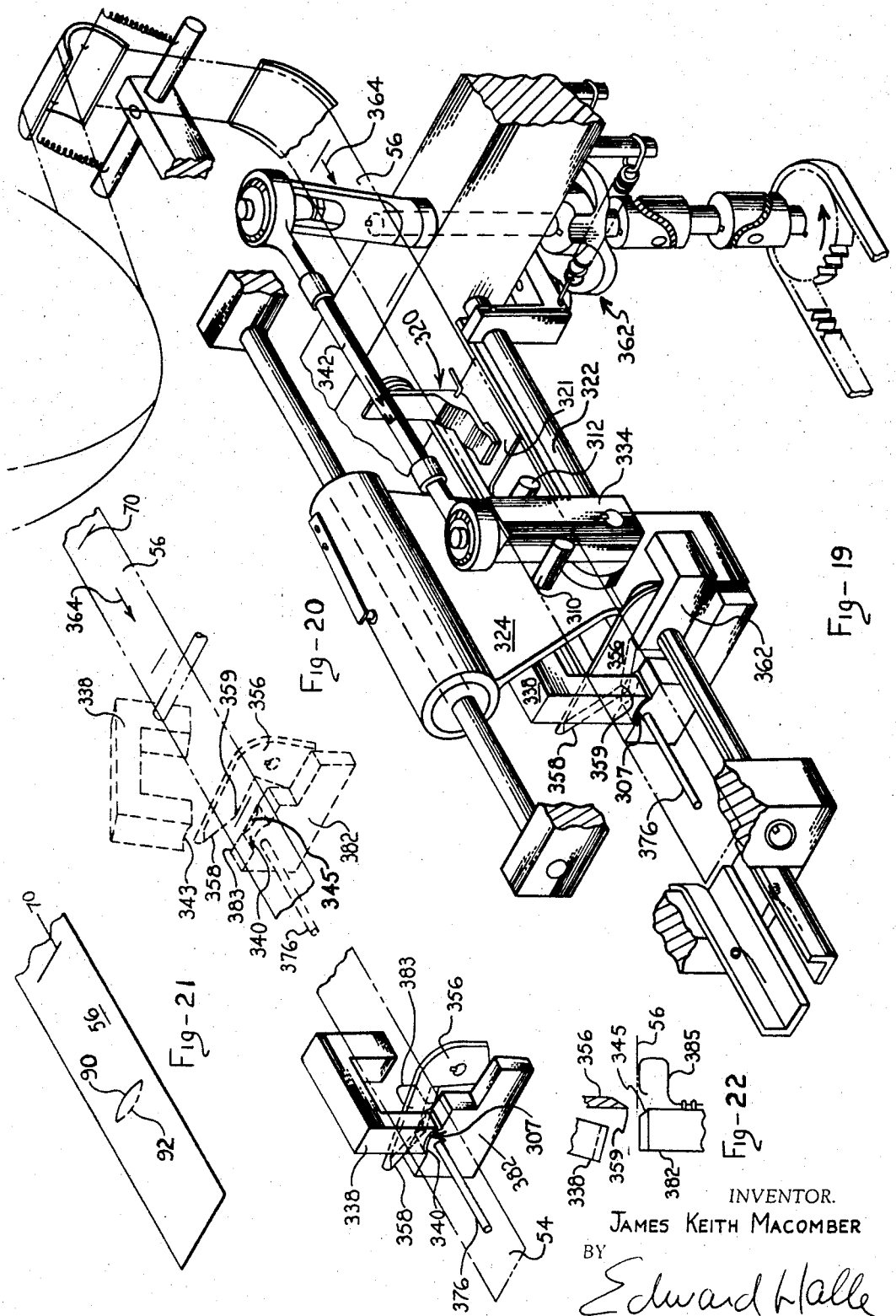

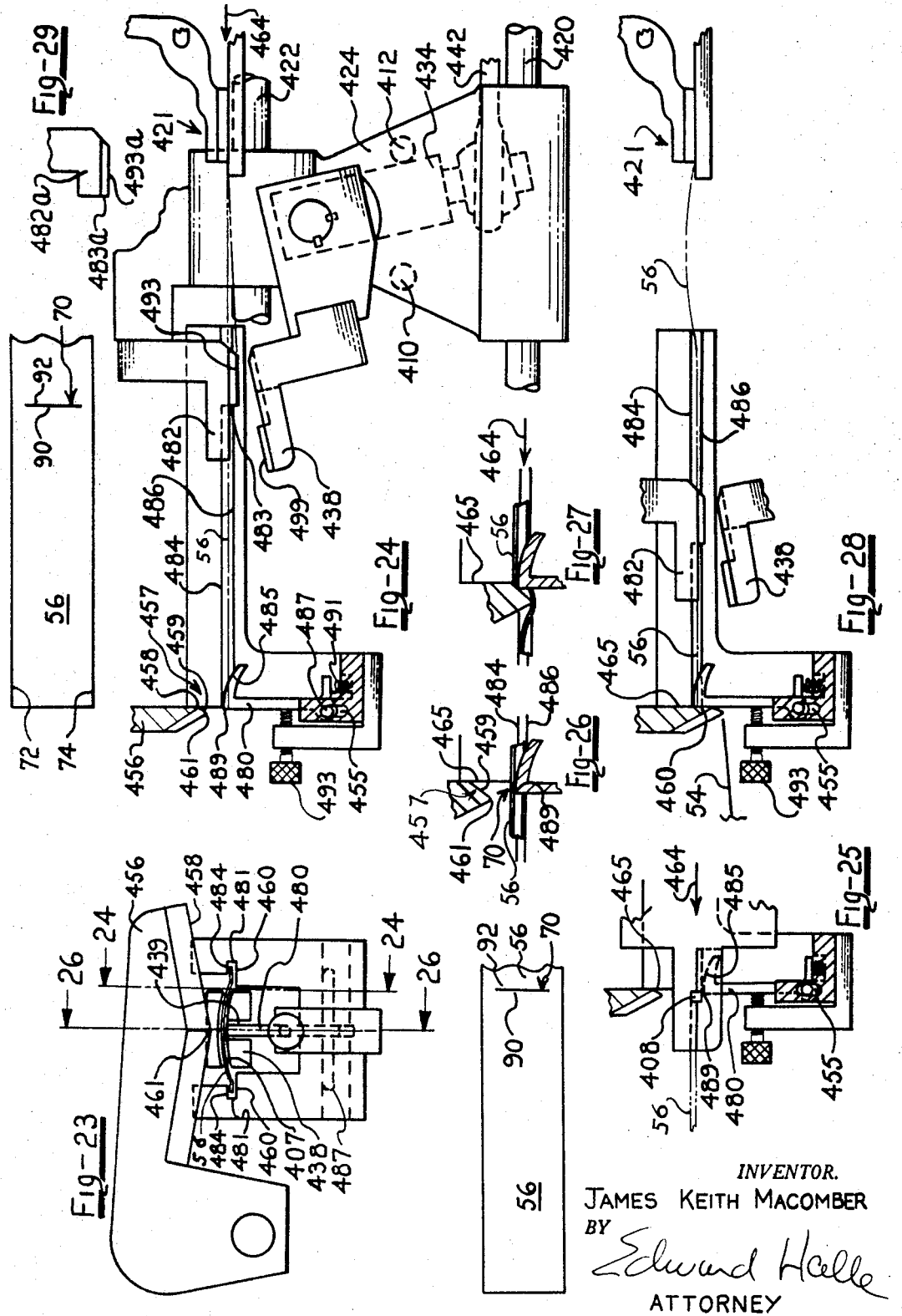

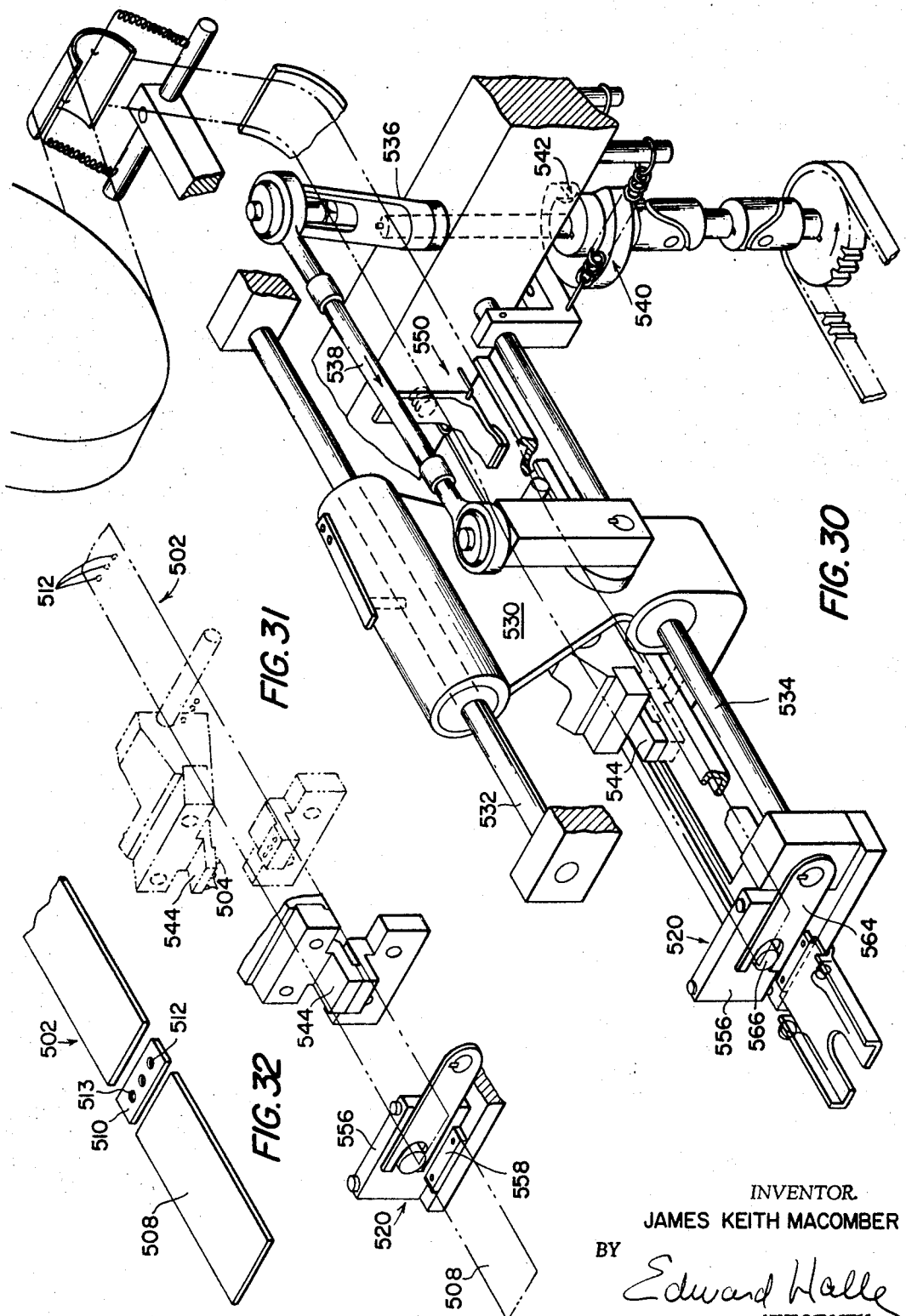

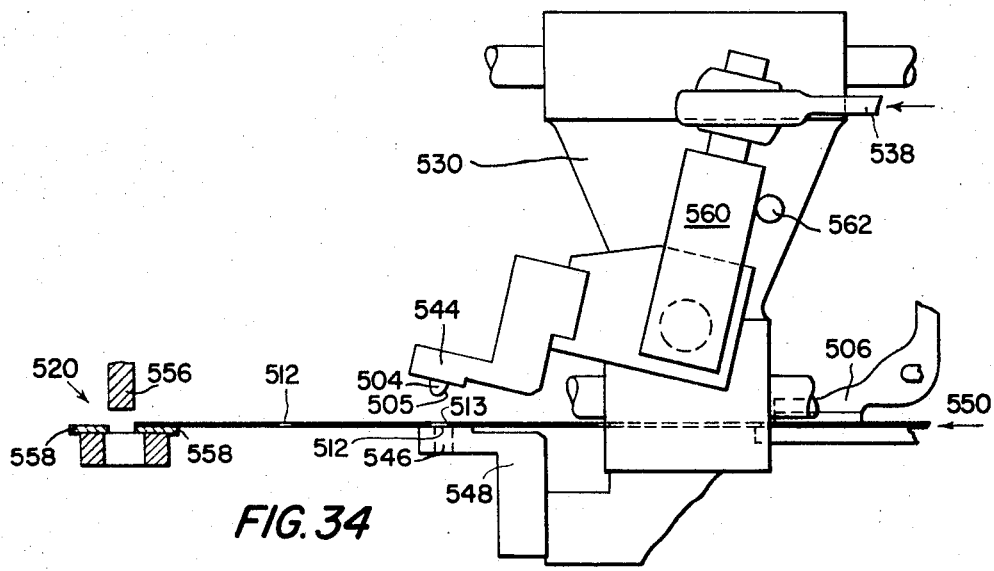
FIG.34
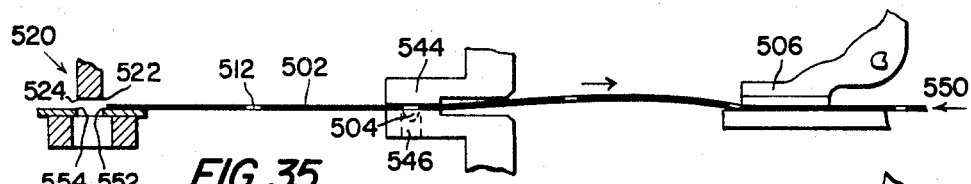
FIG.35
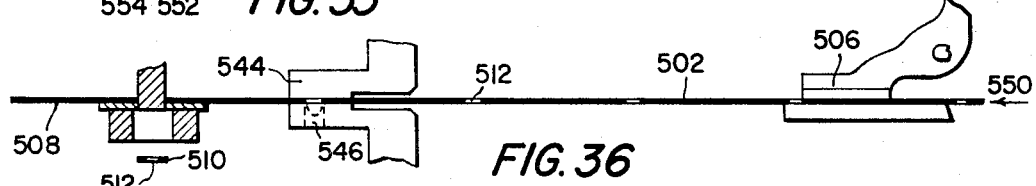
FIG.36
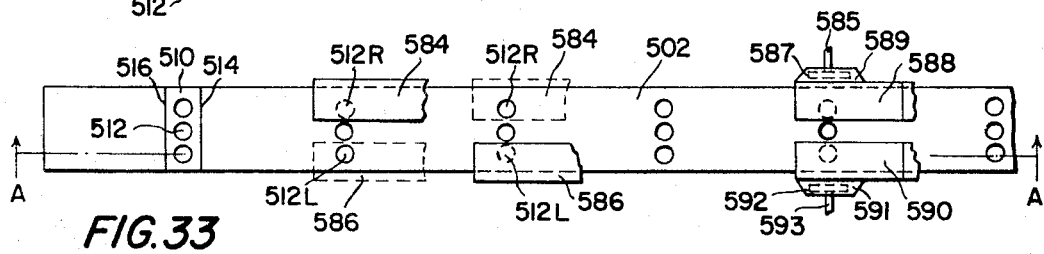
FIG.33
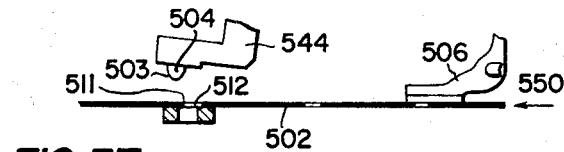
FIG.37
FIG.38
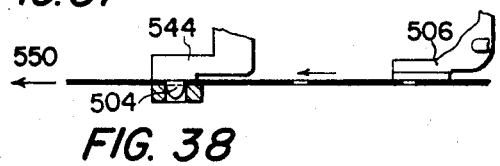
FIG.39 FIG.40 FIG.41
INVENTOR.
JAMES KEITH MACOMBER
BY Edward Halle
ATTORNEY 3,435,717
LABEL FEED AND CUTTING MEANS
James Keith Macomber, Rockville Centre, N.Y., assignor to Consolidated Lithographing Corporation, Carle Place, N.Y., a domestic corporation
Continuation-in-part of application Ser. No. 458,247, May 24, 1965. This application July 27, 1965, Ser. No. 475,220
Int. Cl. B26d 7/14, 5/20; G03b 1/22
U.S. Cl. 83—176                                                    60 Claims

This disclosure relates to apparatus for cutting labels from a continuous ribbon or strip having the labels printed thereon, and for supplying the separate cut labels to labeling or banding apparatus. The continuous ribbon is supplied in a roll to the apparatus of the invention, the ribbon comprising at least one cut or perforation between adjacent printed labels, said cut or perforation being sufficient for mechanical registration purposes but not large enough to sever the ribbon. Registration is accomplished by mechanically engaging the cut or perforation and coercing the ribbon by buckling or bowing, or buckling and bowing same thereby registering the cuts or perforations of each label with an edge of the cutting means so as to sever the label with great accuracy along the original cut or perforation line so that no registration mark remains on the cut label. Registration may also be accomplished in accordance with the invention by mechanically engaging the cuts or perforations to coerce the ribbon into registration and then to move it toward a cutting station having a pair of cutting edges with the cuts or perforations positioned between said pair of cutting edges so as to be removed during the cutting operation, severing each label and removing the registration mark during the cutting operation.

---

This is a continuation-in-part of application Ser. No. 458,247 filed May 24, 1965 and now abandoned.

This invention relates to labeling machines used in packaging various products, said machines having provision to include a separate label either in or on the package or article, either wrapped around an article in conjunction with a wrapper for such article, or separately around such article without a wrapper. In particular, this invention relates to a label feeding machine or attachment having means to supply cut labels or bands from a continuous supply of ribbon, printed with labels, stored on a reel or other ribbon holding means; said cut labels or bands being supplied to the labeling machinery at the proper part of the labeling cycle.

In the usual device of the prior art, labeling and banding machines are provided with a hopper into which precut labels or bands are placed by an operator. The bands or labels are then removed, usually from the bottom of the hopper, by a sucker or other mechanism of the wrapping, packaging or labeling machine, and are placed around the article or wrapped into the package or placed on the package by the main machine. There are also prior art machines which cut and supply labels from storage reels of uncut labels.

There are many such types of packaging and labeling and wrapping machinery, and it is unnecessary to describe any particular type herein. It is sufficient to say that the present invention supplies a cut label at the proper point in the proper cycle of labeling, packaging or wrapping procedures.

Various types of labels are used in packaging procedures. For example, one type of label is a rectangular cut type previously known as the "tax stamp" of a cigarette package which is usually placed at the top of the package to be used both as a revenue stamp and as a sealing label or closure. Now that tax stamps are no longer necessary on each package, a similar label is used in the same position on the package and is known as a closure. The closure label usually is now printed with advertising matter.

Another type of label is a premium coupon such as may be packed with various types of merchandise. There are many other types of labels and bands, rectangular cut, or otherwise, which may either be packed with the merchandise or used as a part of the packaging.

It has always been a problem in connection with supplying labels or bands for packaging to provide a band or label ribbon which has some kind of scanning or registering mark so that the label will be cut at the proper place. Sometimes these registration or scanning marks are made by inking specified portions of the ribbon at regular intervals, sometimes they are made by nicking the edge of the ribbon at regular intervals, sometimes by making a ribbon having a particular uniformly regular edge with particular indentations, sometimes by magnetic means, and at other times by means sensitive to light or electric eye mechanisms or electrically conductive means.

In all of these various types known to the prior art, there is the ever present disadvantage that the registration marks will in some way mar the resulting label or band.

It is, therefore, a principal object of this invention to provide a label feed for feeding and cutting labels from a ribbon or web of material in which there is no visible registration mark left on the cut label.

It is also an object of this invention to provide such a machine in which the resulting cut labels are rectangular in shape with straight edges without any particular form or configuration for holding, pushing or pulling, and in which the said resulting cut labels have straight ends without evidence of any type of hole, punch or perforation which may have been used for either pushing, pulling, driving or registration during the label feeding and cutting process.

It is also an object of this invention to provide a label feed for supplying cut labels from a roll or web of labels partially separated by cuts in which the knife or cutting means is also the registration means.

It is a further object of this invention to provide a device which supplies cut labels in which the labels are cut in such a manner that there is no waste paper from any spacing between the labels, and it is also an object of this invention to provide such a device in which labels of various kinds or shapes may be made with or without a waste paper portion between the said labels.

It is another object of my invention to provide a device which can either be a separate auxiliary device, or an attachment for an existing labeling machine, or incorporated into a new labeling machine which will supply a cut label at the proper point of operation of the machine without the necessity of completely precutting the labels, packing the cut labels and having an operator place the cut labels in the hopper of the labeling machine.

It is a further object of my invention to provide mechanical registration means to cut labels very accurately without the use of electric, or electronic, or other auxiliary devices for registering and cutting the said label. I refer to such devices as the common electrical devices comprising one or more photo-electric cells and solenoids to actuate starting, stopping and cutting mechanisms.

I achieve the objects of my invention by providing a mechanical system in which a ribbon of labels having registration means such as partial transverse cuts, or perforations, or other types of partial cuts between the said labels, is fed from a supply reel by a feeding device having novel ribbon engaging means adapted to engage the said registration means of the ribbon. I also provide a cutting station with novel cutting means adapted to engage the said registration means of the ribbon. I may also provide a cutting station having novel cutting means to remove the said registration means of the label during the cutting operation. I may also provide means to strengthen the ribbon by confining it in a transversely bowed condition and to coerce the ribbon at the cutting station or elsewhere by bowing it transversely, and means to coerce the ribbon longitudinally between the said cutting station and the ribbon engaging means, or between the said cutting station, or the said ribbon engaging means, and at least one other element of the device to cause longitudinal buckling to achieve registration of the cutting means with the ribbon, so that the cutting means will cut off a label at the proper point of registration. Any reference herein to a label or labels is meant to include bands, closures, coupons or any other specialized form of label.

Further objects and advantages, as well as means to achieve them, will appear in the specification hereinbelow. The invention is illustrated in the accompanying drawings in which:

FIG. 1 is a perspective view of my invention as adapted to be incorporated in a labeling, packaging, wrapping or banding machine, omitting bowing means 180, 184 shown in FIGS. 8 through 12;

FIG. 2 is a diagrammatic perspective view similar to FIG. 1 showing the working parts of my invention in relative positions, with the portions in solid line shown in forward position, and the portions in dotted line shown in rearward position;

FIG. 3 is a sectional view of the carriage or head, the rocker arms, the jaws and the ribbon pathway of my device as seen along the lines 3—3 in FIG. 1;

FIG. 4 is a side elevational detail of the jaws of my device showing in the extended portions end elevations of each of the jaws respectively;

FIG. 5 is an elevational detail similar to FIG. 4 showing the jaws in closed position;

FIG. 6 is an enlarged sectional view along the lines 6—6 in FIG. 5 showing the jaws of the device engaging a ribbon within the ribbon pathway;

FIG. 7 is a sectional view along the lines 7—7 in FIG. 1, with parts cut away, showing the cam and cam roller for operating the cutting means of my device;

FIG. 8 is an enlarged end elevation of the end of the ribbon pathway of the device shown in FIG. 1 showing the cutting means of the device in upper or first position with parts cut away;

FIG. 9 is a section along the lines 9—9 of FIG. 8 with parts cut away;

FIG. 10 is a view similar to FIG. 8 showing the cutting means in the intermediate or second position;

FIG. 11 is a section along the lines 11—11 in FIG. 10;

FIG. 12 is a sectional view similar to FIG. 11 showing the cutting means in third position;

FIG. 13 is an end elevation of an alternate form of cutting means for the device comprising a die;

FIG. 14 is a top view of FIG. 13 as seen in the direction of arrows 14—14;

FIG. 15 is a top plan view of that part of the label ribbon which is cut away as waste when the die makes its cut;

FIG. 16 is a perspective view of a leading end of a ribbon of labels, with the balance of the ribbon of labels cut away, with a transverse cut shown in bowed position and another transverse cut shown flat to illustrate the bowed portion of the first mentioned cut which the ribbon assumes when being fed through the forms of the device of the invention as shown in FIGS. 1, 13 and 17;

FIG. 17 is a perspective view similar to FIG. 1 showing an alternate form of the device;

Figure 42:
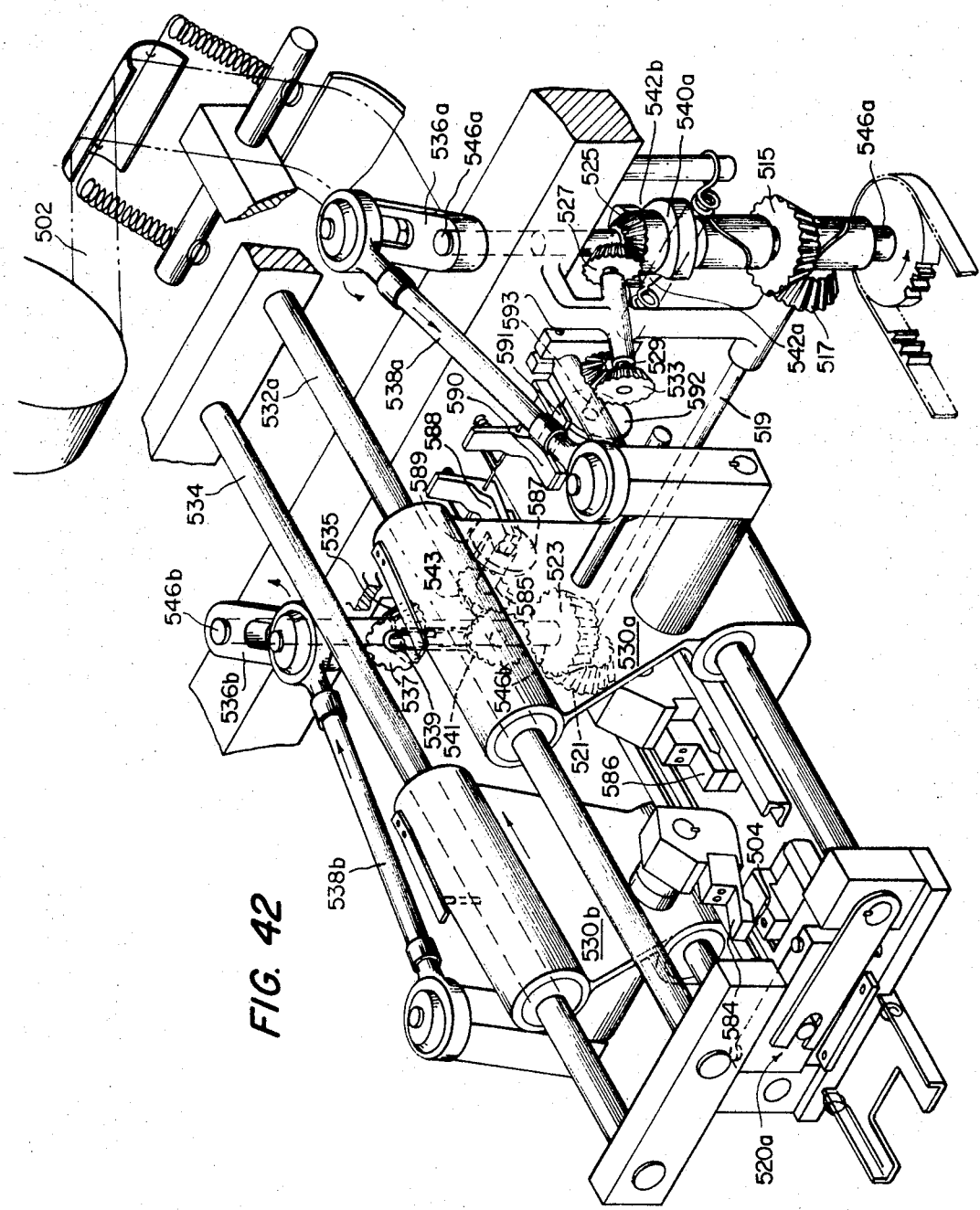

FIG. 18 is a diagrammatic perspective view similar to FIG. 17 showing the working parts of this form of the invention in relative positions with the portion in solid line shown in rearward position and the portion in dotted line shown in forward position just after the label has been cut and the jaws are beginning to return to the rearward position. There is a break in the middle of the figure to indicate that the forward and rearward positions are actually closer than shown in the figure;

FIG. 19 is a perspective view of another alternate form of the device;

FIG. 20 is a diagrammatic perspective view similar to FIG. 19 showing the working parts of the form of invention of FIG. 19 in relative positions, with the portions in solid line shown in forward position, and the portions in dotted line shown in rearward position. There is a break in the middle of the figure to indicate that the forward and rearward positions are actually closer than shown in the figure;

FIG. 21 is a perspective view of a leading end of a ribbon of labels with the balance of the ribbon of labels cut away, with a transverse cut shown in bowed position and another transverse cut shown flat to illustrate the bowed portion of the first mentitoned cut which the ribbon assumes when being fed through the form of the device of the invention as shown in FIG. 19;

FIG. 22 is a side elevational detail of the jaws, knife and ribbon supporting spring of the form of device as shown in FIGS. 19 and 20 with the knife shown in section and with parts cut away;

FIG. 23 is an end elevational view, similar to the view as shown in FIG. 8, showing an alternate form of the invention;

FIG. 24 is a sectional view along the lines 26—26 in FIG. 23, except that the jaws as shown in FIG. 24 are in the starting phase of the operation cycle at an earlier stage than that shown in FIG. 23, with a portion of label ribbon relating to this phase shown in exploded relationship in top plan at the top of the figure;

FIG. 25 is a sectional view along the lines 24—24 in FIG. 23 showing the device in a later phase of the operation cycle than shown in FIG. 24, but the same as that shown in FIG. 23;

FIG. 26 is an enlarged sectional view of certain parts only, taken along lines 26—26 of FIG. 23, but showing the device in a still later phase of the operating cycle;

FIG. 27 is an enlarged view similar to FIG. 26 showing the device in a still later phase of the operating cycle;

FIG. 28 is a sectional view similar to FIG. 25 with the addition of the brake and associated parts, showing the device in a final phase of the operating cycle;

FIG. 29 is a detail of FIG. 24 showing an alternate upper jaw;

FIG. 30 is a perspective view of another alternate form of the device;

FIG. 31 is a diagrammatic perspective view similar to FIG. 30 showing the working parts of the device of FIG. 30 in relative positions, with the portion in solid line shown as it reaches forward position, and the portion in dotted line shown as it reaches rearward position;

FIG. 32 is a perspective view of a leading end of a ribbon of labels as used with the device shown in FIG. 30 with the balance of the ribbon of labels cut away, and showing the said ribbon with the leading label, and the registration portion, cut off;

FIGURE 33 is a top plan view of a label ribbon used with the device of FIG. 30 showing portions of a form of the device provided with twin out-of-phase feeding jaws and twin brakes rather than a single feeding jaw and single brake as shown in FIG. 30;

FIG. 34 is a side elevation of parts of the device of FIG. 30 with the ribbon in section as along the lines A—A of FIG. 33, and other parts in section along the same section line as the ribbon, showing the feeding head and jaws in open rearward position, and the cutting means in first position;

FIG. 35 is a side elevation of parts of the device of FIG. 30 with the ribbon in section as along the lines A—A of FIG. 33, and other parts in section along the same section line as the ribbon, showing the jaws in closed rearward position, and the cutting means in first position;

FIG. 36 is a side elevation of parts of the device of FIG. 30 with the ribbon in section along the lines A—A of FIG. 33, and other parts in section along the same section line as the ribbon, showing the jaws in their most forward position and the cutting means in second position;

FIG. 37 is a view similar to FIG. 34 showing some of the parts of FIG. 34 but with the ribbon in a different starting position;

FIG. 38 is a view similar to FIG. 37 with the jaw shown in closed rearward position;

FIG. 39 is a bottom plan view of a male die member which may be used in the cutting means of the invention;

FIG. 40 is a bottom plan view of another form of male die member which may be used in the cutting means of the invention;

FIG. 41 is a bottom plan view of another form of male die member which may be used in the cutting means of the invention;

FIG. 42 is a perspective view of another alternate form of the device; and

Figure 43:
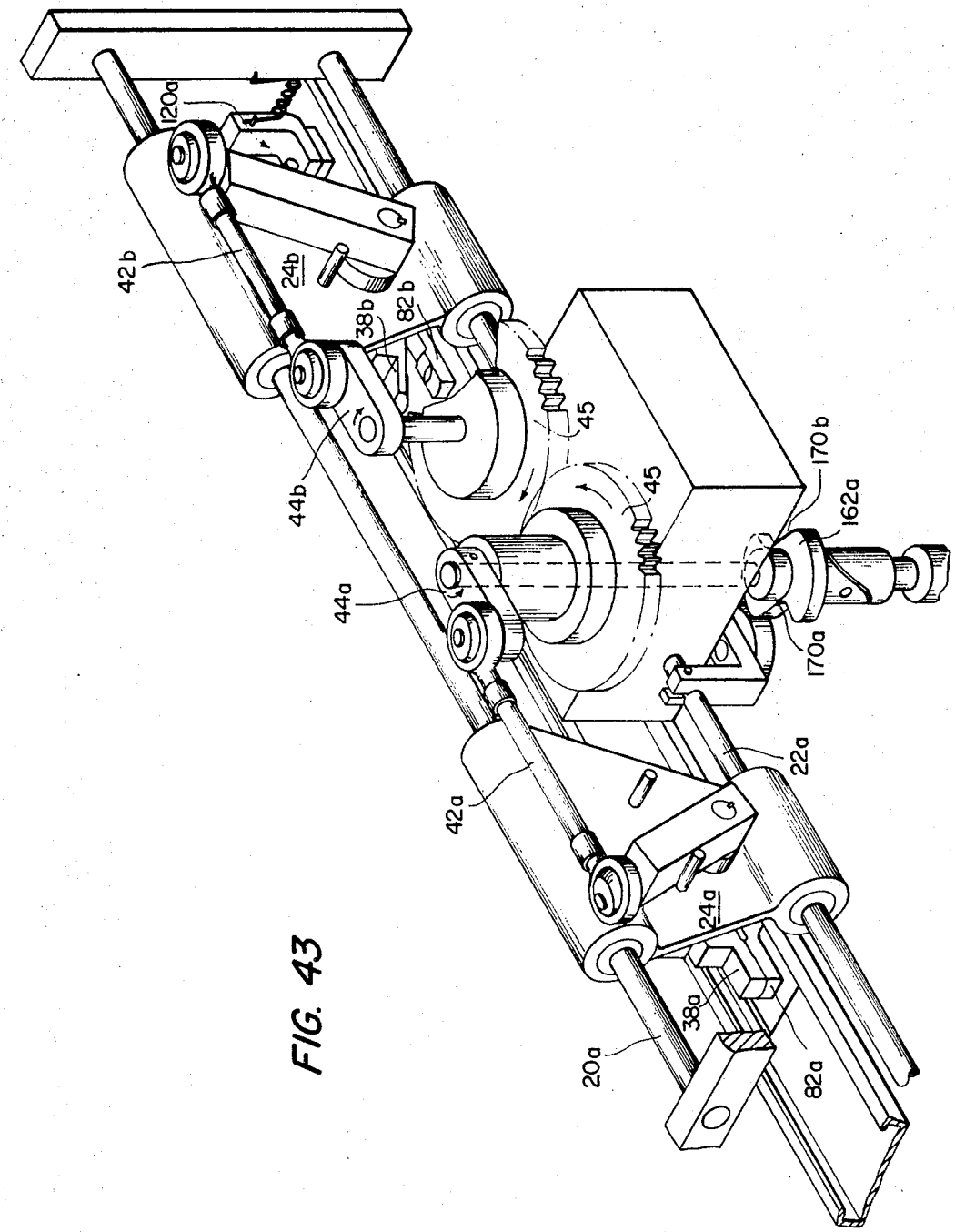

FIG. 43 is a perspective view of another alternate form of the device.

Similar numerals refer to similar parts throughout the several views.

My label feed includes a main frame comprising a ribbon path, mechanical feed means to drive or push a ribbon of labels prepared with partial transverse cuts between the said labels on the said ribbon, registration means and cutting means. The mechanical feed means has guide means including shafts 20 and 22 for a head, or carriage 24. The shafts 20 and 22 may be mounted on the main frame of a labeling, banding or packaging machine, or on the frame of an auxiliary unit, in any suitable manner. I provide a reciprocating head 24 with bearings 26 and 28 adapted to slide fit around the shafts 20 and 22 respectively. The head 24 has a bearing or shaft hanger 30 (as shown in FIG. 3) within which I place a shaft 32 which has a rocker arm 34 at one end and a rocker arm 36 at the other end. Rocker arm 36 has an upper jaw mounted on it by means of screws 40. Rocker arm 34 is connected by means of a link 42 to a feed drive crank 44. Link 42 has ball joint suspension bearings 48 and 50 which connect to the rocker arm 34 and the feed drive crank 44 respectively. Feed drive crank 44 is in turn connected with a band or label feed drive shaft 46 which comprises universal joints 52. Shaft 46 is connected to the familiar main drive (not shown) of a labeling or packaging machine by means of a Gilmer or other drive (not shown completely) as it is old and familiar in the art. The drive connection is made by means of a 1 to 1 ratio so that every time the main drive of the machine makes one revolution, the label feed drive shaft 46 will make one revolution. This ratio should deliver one cut label 54 for each revolution of the main drive which will correspond to each labeling or wrapping cycle of the machinery. Thus, for each article to be labeled or wrapped and labeled, a label will be presented to the wrapping or labeling turret of the machine for each labeling cycle.

The labels 54 are cut from a label ribbon 56 drawn from a reel 58 suspended on the main frame of the device. The ribbon 56 is drawn past a plate 60, supported by spring wire 62 mounted on the main frame, to the ribbon path or pathway 64. The ribbon path or pathway 64 is generally defined by guide means for guiding the ribbon 56. These may be opposed portions 66 and 68 comprising the ribbon guide means. Ribbon guide portions 66 and 68 are mounted on the main frame of the device and provide facing opposed channels for the edges of the ribbon 56 to ride through. Guide means 66 and 68 are spaced sufficiently apart so that the label ribbon 56 may slide or be pushed within the pathway 64 between guides 66 and 68 without undue drag or friction.

The label ribbon 56 comprises a series of labels 54 which are as yet not completely severed while still on the label ribbon 56. Each label 54 is defined at its ends by a transverse cut 70 cut through a central portion of the ribbon 56, leaving the edge portions of the ribbon intact. Thus, each partial transverse cut 70 defines an end of one label 54 and the beginning of the next label 54, and the printed material is placed between the transverse cuts 70 when the ribbon of labels 56 is printed. The transverse cuts 70 may be made by the same printing press which prints the labels in any manner well known to the art.

The transverse cut 70 should be made in a manner which leaves the edges 72 and 74 of the ribbon 56 intact. Also the cuts should be sufficiently long for the purposes of feeding and registering as will be set forth hereinbelow, and short enough to leave sufficient material on the ribbon between the transverse cut 70 and the edges 72 and 74 so that the ribbon will not break during the normal operation of the equipment.

The reciprocating head 24 has an arm or bracket 80 to which a lower jaw 82 is mounted by means of screws 84. The upper jaw 38 is above the plane of the ribbon pathway 64, and the lower jaw 82 is beneath the plane of the ribbon pathway 64. The expressions "above" and "below" are used for purposes of orienting the parts of the device. If the plane of the ribbon pathway is in a vertical rather than a horizontal position, then, of course, jaw 38 would be on one side of the plane and jaw 82 would be on the other side of the plane of the ribbon pathway 64. By the same token, if the entire device were constructed so that it would operate in an upside down position, then jaw 38 would be relatively below the ribbon pathway and jaw 82 would be relatively above the ribbon pathway. In describing the device herein, for purposes of clarity as well as for purposes of definition, it will be assumed that the various forms of the invention described will be used in the position as shown in the figures of the drawings, with the ribbon path plane in a horizontal position. However, it is understood that the device may be used in any position, and the terms "above" and "below" and other such terms are intended to cover, both in this specification and in the claims hereinbelow, a relative positioning so that if the device were constructed sidewise with the ribbon plane in a vertical position, the term "above" would be understood to mean "at a side of" and if the device should be constructed in an upside-down position with the ribbon path on a horizontal plane, then the term "above" would be construed to mean "below."

The device is provided with mechanism to cause the edges of the transverse cuts 70 in the ribbon of labels 56 to bow to permit the feed means of the device to push or pull the ribbon and also to permit the cutting means of the device to cut at the exact registration line, namely at transverse cut 70.

The drive of the ribbon 56 through the ribbon pathway 64 is accomplished by bowing the leading edge 90 and trailing edge 92 of transverse cut 70 in opposite directions so that a jaw, such as jaw 82, can engage the leading edge 90 of bowed transverse cut 70 in label ribbon 56 by means of a shoulder 94 formed in jaw 82. Reference to FIG. 4 of the drawings shows that jaw 82 has a shoulder 94 between a concave portion 96 and a convex portion 98. The concave portion 96 of the upper surface of the jaw 82 extends from the leading edge 100 up to the shoulder 94. At shoulder 94, the upper surface of jaw 82 becomes convex as designated by reference numeral 98, and the convex portion 98 extends from shoulder 94 to the trailing edge 102 of upper surface of jaw 82.

The upper jaw 38 has corresponding convex and concave portions 104 and 106 respectively which are complementary to concave and convex portions 96 and 98 respectively when the jaws are closed as shown in FIG. 5 of the drawings. Further reference to FIG. 5 of the drawings will show that convex portion 104 ending in shoulder 95 is relatively shorter than concave portion 96 leaving shoulders 94 and 95 in facing spaced relationship with space 108 between them.

Thus, when jaws 38 and 82, which are positioned respectively above and below ribbon pathway 64, are closed with ribbon 56 between them, and with a transverse cut 70 positioned within space 108, ribbon 56 will be caused to bow transversely by the engaging surfaces 96, 104, 98 and 106 of the jaws 82 and 38 so that the leading edge 90 will bow downwardly as shown in FIG. 6 of the drawings, and the trailing edge 92 will bow upwardly. Then when the jaws 38 and 82 are moved on the forward cycle of the feed main drive of the device, shoulder 94 will engage or abut leading edge 90 of the transverse cut 70 and push the label ribbon 56 in a forward direction, engaging the ribbon 56 at the leading edges 90 of transverse cuts 70 in each instance.

It is to be understood that the jaws 38 and 82 are so positioned when in closed position that they do not clamp the ribbon between them but rather cause the ribbon to bow transversely so that the leading edge of transverse cut 70 may be engaged by shoulder 94 soon after the reciprocating head 24 starts to move forward. The jaws do not clamp the ribbon because the spacing between the opposing concave and convex surfaces of the jaws is slightly greater than the thickness of the ribbon. This spacing as indicated at reference numeral 107 (as shown in FIG. 6 of the drawings), is a facing spaced relationship between the ribbon engaging surfaces. However, the ribbon is closely confined between the opposing concave 96 and convex 104 jaw surfaces, but is free to slide relative to the jaw surfaces. Without this close confinement, the leading edge 90 of the transverse cut 70 would deform when subjected to pressure from the lower jaw shoulder 94, and the ribbon would start to tear at the ends of the transverse cut. The substantially facing spaced relationship between the jaws is thus needed to prevent the ribbon from buckling longitudinally between the surfaces of the jaws.

It will be appreciated that the label ribbon 56 is moved forward by the shoulder 96 of jaw 82 when the jaws are in closed position since the jaws are mounted on reciprocating head 24 which imparts a reciprocating movement to the jaws. When the ribbon 56 is to be moved forward, the jaws are in closed position. When the device reciprocates in reverse direction, the jaws are in open position. This is accomplished by raising upper jaw 38 on the reverse movement by the action of rocker arm 36 as I will explain more fully hereinbelow.

I have described the jaws of the mechanism as having concave and convex surface portions. It is to be understood that it is not necessary for the operation of the invention that these portions be perfectly or completely concave or convex. It is sufficient that they are substantially concave or convex, or in other words, non-planar. For example, it would be sufficient, for purposes of operation of the invention, if a ribbon engaging means such as the first or lower jaw 82 would be a substantially concave surface portion in front of a pushing means such as a shoulder 94. I prefer a substantially concave portion because this would take the natural curve of the transverse bow of leading edge 90 of the transverse cut 70 of the ribbon 56. However, any non-planar surface having a centrally depressed portion will suffice. In such case, the other ribbon engaging means such as the second or upper jaw 38, should have a non-planar surface at least in part complementary to the type of surface of the first or lower jaw.

*Operation of the ribbon feed*

In order for the device to operate properly, jaw closing means are provided so that the jaws may be opened and closed with relation to the ribbon pathway 64. The jaw closing means comprise connecting means to the main drive of the device, including the link 42 and the rocker arms 34 and 36 as well as other elements including stop means.

The reciprocating head 24 is provided with stop means, a first stop means or forward stop pin 110, and a second stop means or rear stop pin 112. The function of these stop means 110 and 112 are as follows: The forward stop pin 110 and the rear stop pin 112 limit the rocking movement of rocker arm 34. For purposes of illustration, the reciprocating means of the device is at starting position when the reciprocating head is at its normally rearmost position, and the jaws are open. When link 42 moves in a forward direction as shown in the arrow F in FIG. 1 of the drawings, it pushes rocker arm 34 forward. This causes jaw 38 to move downwardly until it almost meets jaw 82, with a small clearance between the surfaces of the said jaws, leaving them in spaced facing relationship as described hereinabove. This will occur when rocker arm 34 hits forward stop pin 110. The forward rocking action will then cease, jaw 38 will stop moving downwardly, and the entire reciprocating head 24 and its components will then move forward. Band ribbon 56 will then be bowed transversely between the jaws 38 and 82 as described hereinabove with shoulder 94 pushing leading edge 90 of transverse cut 70, thereby moving label ribbon 56 in a forward direction. Shortly, link 42 will stop and reverse because of the action of feed crank 44. At this point, jaw 38 will move in an upward direction because rocker arm 36 will be pulled back in a reverse direction by link 42 which pulls back rocker arm 34 connected to rocker arm 36 through shaft 32. Rocker arm 34 will continue to move back until it hits stop pin 112 at which point further reverse movement of link 42 will pull reciprocating head 24 back since stop pin 112 will stop the rocking motion lifting jaw 38 and thereby transferring the force of the backward movement of link 42 to the head 24 itself causing the head 24 to move rearwardly. When rocker arm 36 moves up with jaw 38, the jaws 38 and 82 assume an open position, and reverse movement of jaw 82 will draw it away from ribbon 56 disengaging shoulder 94 from transverse cut 70.

When the link 42 stops and reverses, as aforesaid, the ribbon 56 is held motionless by ribbon holding means such as friction braking means 120 comprising a felt pad 122 adapted to hold the ribbon 56 against a stationary part 124 of the ribbon pathway 64. Felt pad 122 is mounted at one end of a brake arm 126 which is held in place by means of a bearing 128 attached to the main frame of the device. The friction braking means also comprises a spring arm 130 together with spring means such as a compression spring 132 which is seated against the spring arm and against another portion such as the main frame of the device. End 134 of spring arm 130 may serve as a thumb release. By pressing in end 134 against action of spring 132 with the finger or thumb, the operator may release the felt brake pad 122 whenever necessary, as for example when inserting a new label ribbon 56 into the device.

The tension of friction brake 120 is such that when there is no pulling action on the label ribbon 56, the label ribbon will be held motionless against backward pull exerted by tension in springs 62, but when there is pulling action by means of the jaws, the brake 120 will permit the label ribbon 56 to move forward. The movable reciprocating head or carriage 24 is moved forward and backward only by action of rocker arm 34 against stop pins 110 or 112 respectively as the case may be. At all other times, especially when rocker arm 34 is in the act of raising or lowering the upper jaw 38, reciprocating head 24 is prevented from moving usually by means of normal friction of bearings 26 and 28 on shafts 20 and 22. I may also provide a nylon friction brake 140 which fits in an aperture 142 in the head 24. Friction brake 140 is pressed against shaft 20 by means of a flat spring 144 which is fastened to head 24. This friction brake 140 will prevent movement of the head 24 when the power transmission means, such as the link 42, is not acting directly against stops 110 or 112. When the transmission means applies power to the head 24 by means of one of the said stops 110 and 112, the head 24 will move; otherwise, it will be held in place by the braking means 140. Thus, after jaw 38 is raised, the action of link 42 continues in reverse direction, pulling rocker arm 34 against stop pin 112 to draw head 24 back to its original or starting position. Therefore, one revolution of the label feed drive shaft 46 will move the means adapted to advance the label ribbon, such as the reciprocating head 24, forward and back again in a reciprocating feed motion, or cycle, by means of the transmission or drive linkage means which includes link 42. Before the head 24 starts to move forward on the forward portion of the feed cycle, jaw 38 will close toward jaw 82 causing the jaws to engage and bow the edges of a transverse cut 70 of ribbon 56 within space 108 between shoulders 94 and 95. At this point, the head 24 and jaws 38 and 82 will move forward causing shoulder 94 to engage leading edge 90 of transverse cut 70 and then feed the ribbon 56 forward approximately one length of label 54. Then the linkage will reverse itself to raise jaw 38 and move the reciprocating head 24 backward again on the return portion of the feed cycle with the jaw 38 raised until back to starting position. Therefore, for each complete cycle there will be a lowering of jaw 38, a forward movement of the jaw with the head 24, then a raising of jaw 38 and a reverse movement of jaw 38 with head 24. Thus, each succeeding cycle or revolution will move the label ribbon 56 forward for the distance approximately equivalent to the distance between each of the regularly spaced transverse cuts 70. The term "approximately" is used because the forward motion of the jaws 38 and 82 is a little greater than the nominal or average label length. The actual length of a label 54 after it is cut from the label ribbon 56, as described hereinbelow, is the distance between two consecutive transverse cuts 70. Since there must be a manufacturing tolerance in placing the partial transverse cuts 70 in the ribbon 56 during printing, the distance between successive transverse cuts 70 will vary by a small amount, say up to plus or minus 1/64 inch. The longitudinal spacing 108 between shoulders 94 and 95 in FIG. 5, must be slightly greater than the total of the above-mentioned plus and minus tolerances to insure that the shoulders 94 and 95 will straddle a transverse cut 70 when they close upon the ribbon 56.

Adjustment of the mechanism to accommodate labels 54 of different sizes may be made on crank 44 which has an adjustment slot 150, and by means of varying the length of link 42.

*The cutting means*

The ribbon cutting means or knife means 152 comprises a stationary blade 154 at the forward or leading end of the ribbon pathway 64 and a moving blade 156 adapted to sweep across the stationary blade 154 to make a cut in scissor-like fashion. The cutting means 152 also serves as a ribbon transverse cut engaging means for purposes of making exact registration as will be described hereinbelow.

The moving blade 156 goes through a cycle for each revolution of shaft 46 which includes a first position above and completely out of the way of the ribbon pathway 64 and the label ribbon 56 (see FIGS. 1, 8 and 9); a second or intermediate position in which a portion of the edge 158 of knife 156 moves within that part of the ribbon pathway 64 through which the bowed portion 92 of the transverse cut 70 of label ribbon 56 will move after leading edge 90 and trailing edge 92 of transverse cut 70 are separated by bowing means, so that knife edge 158 will definitely engage trailing edge 92 of the bowed transverse cut 70 (see FIGS. 2, 10 and 11); and a third or cutting position in which cutting edge 158 passes transverse edge 160 of stationary knife blade 154 to cut through the ribbon 56 precisely in register with the transverse cut 70 (see FIG. 12). Thus, first or top position of knife blade 156 keeps the blade completely above the ribbon 56 and ribbon pathway 64, second or intermediate position places edge 158 (either motionless or moving) within the ribbon pathway 64, and third position, or cutting position places edge 158 of blade 156 below the plane of the ribbon pathway 64 after accomplishing the cut.

Bowing means 180 and 184 in the ribbon pathway 64 (FIGS. 8 to 12) are designed to coerce the ribbon 56 causing it to bow substantially upwardly as it reaches the end of the ribbon path 64 in the vicinity of the cutting means 152. This is best done, as illustrated in FIGS. 8 through 12 of the drawings, by providing at least one upwardly disposed centrally located protuberance 184 to raise the central portion of the ribbon 56 higher than the usually normal plane of the ribbon path 64, together with a pair of downwardly disposed edge protuberances 180 located near the edges of ribbon path 64 and positioned to maintain edges 72 and 74 of ribbon 56 at the usually normal plane of ribbon path 64 against the upward urging of centrally located protuberance 184. This arrangement will effectively bow the ribbon in the vicinity of cutting knife 152.

The knife blade 156 is actuated by the main drive of the device in the following manner. Shaft 46 has a cam 162 installed on it (FIGS. 1 and 7). Cam 162 has an outer contour 164, an intermediate dwell 166, and a final dwell 170. A cam follower wheel bracket 172 is attached to shaft 22. Shaft 22 is installed on the main frame of the device in a manner which permits it to be rotated by lever action of bracket 172. A cam follower 174 is rotatably attached to bracket 172 and is held against cam 162 by action of springs 175 which are secured at one end to mountings such as posts 176 and at their other ends to the bracket 172. These tension springs 175 will pull bracket 172 toward cam 162 and shaft 46. Knife 156 is fastened to the forward end of shaft 22 in such a relative position that its blade edge 158 will be in the first or upper position when cam follower wheel 174 is maintained against cam outer contour 164 by action of the springs 175. As shaft 46 rotates in a counter-clockwise direction when viewed from above as in FIG. 7 of the drawings, at one time during its revolution intermediate dwell 166 will pass cam follower 174 and cam follower 174 will fall into intermediate dwell 166. This will cause shaft 22 to rotate partially in a counter-clockwise direction because bracket 172 will be pulled toward shaft 46. During the period when cam follower 174 is in intermediate dwell 166, moving knife 156 will be in its second or intermediate position as described hereinabove. Cam 162 will continue to rotate, presenting final dwell 170 to cam follower 174, causing further rotation of shaft 22 in a counter-clockwise direction, moving knife blade 156 down to its third or cutting position causing its edge 158 to sweep past edge 160 of stationary knife 154, thereby cutting a label 54.

Although I have described the second position as a stationary position, it is not necessary for the moving knife blade 156 to be at rest in the second position. It may move slowly within the bowed area of trailing edge 92 of transverse cut 70 as described hereinabove during this second position. For this purpose, instead of having a dwell 166, the cam may incline from its outer contour 164 until it reaches the final dwell 170. While I have described a cam and cam follower arrangement for moving the knife to its three positions, any type of arrangement which may be devised can be used.

Cam 162 is so oriented with respect to shaft 46 that at the end of each feeding cycle, a length of label ribbon 56 will be severed. Then as the mechanism disengages the feeding jaws and draws back the head 24, the knife 156 will move up to first position out of the ribbon pathway 64. Just before the jaws again reach their most forward position, knife edge 158 will be placed in its second or intermediate position to engage the trailing edge 92 of the next transverse cut 70 of the ribbon, and, again after the ribbon comes to rest at the end of its forward cycle, knife edge 158 will move to third position below the ribbon path 64, making the cut. This cycle will repeat itself and will comprise the intermittent motion of the ribbon and a cut for each cycle at a time when the end of the ribbon is at rest.

Registration

Registration of the transverse cut with the knife is accomplished by cooperation of the jaws 82 and 38 engaging the ribbon 56, as described hereinabove, and urging it forward to be engaged by the knife edge 158. Knife edge 158, as has been described, engages the upper bowed portion 92 of the trailing edge of transverse cut 70 which has been bowed by the bowing means 180 and 184.

To insure that knife edge 158 will engage bowed portion 92, the ribbon 56 is coerced to buckle longitudinally as indicated at reference numeral 181 in FIG. 2 of the drawings, between knife edge 158 and jaws 82 and 38. This longitudinal buckling 181 is caused by making the distance between inner side 182 of moving knife 156 (in the same plane as edge 158) and the most forward position of the feeding jaw shoulder 94 relatively shorter than the length of the ribbon 56 between the transverse cuts 70 being engaged by the knife edge 158 and the shoulder 94, respectively. Thus, when the said jaws are in their most forward position, the label ribbon 56 will necessarily have to buckle behind knife edge 158 because the length of the ribbon 56 between these two points (158 and 94) will be relatively longer than the distance between the said two points.

In FIGS. 8 through 12 of the drawings, details of the cutting mechanism including the moving cutting blade, the bowing means and the end of the ribbon pathway 64, are shown. In FIG. 8, the knife edge 158 is in the first position above the ribbon pathway 64. At this point of the cycle, the mechanism has already cut a label or band from the end of the ribbon 56, and the next portion of the ribbon 56 to be cut has started to be fed. The moving knife blade 156 and its edge 158 are above the ribbon pathway and out of the path of the ribbon so as not to hinder its forward movement. This is also illustrated in FIG. 9 of the drawings which is a sectional view in the direction 9—9 of FIG. 8.

When the ribbon 56 is in the position as shown in FIGS. 8 and 9, the ribbon edges 72 and 74 are held down to the normal plane of the ribbon pathway 64 by edge portions 180 of the bowing means. At the same time, central portion 184 of the bowing means pushes up the middle of the ribbon 56 to form an upward bow which can readily be seen in FIG. 9 of the drawings. The bowing means as shown in FIGS. 8 and 9 are longitudinally inclined. There is a short space or gap of approximately 1/16 of an inch 183 between the end of the bowing means 180 and 184 and the cutting edges 158 and 160 of the cutting means. This space is provided so that when knife edge 158 moves from the first position above the ribbon pathway into the second position, it will engage the ribbon 56 and cause the leading edge 90 of cross cut 70 to bow in the direction opposite to the upper bow of trailing edge 92. This position is illustrated in FIGS. 10 and 11 of the drawings. Space 183 is provided to permit the reverse bowing of leading edge 90 without the knife edge 158 cutting or otherwise deforming the ribbon 56. Without space 183, knife edge 158 would act against the ends of bowing means 180 and 184 to harm the ribbon. It is desirable for transverse cut 70 to enter space 183 just as, or immediately before, the descending knife edge 158 impinges upon the ribbon 56.

The ribbon 56 continues to move forward until trailing edge 92 of the transverse cut 70 abuts inner side 182 of the knife. At this point, the reciprocating head continues to move forward, continuing to push the ribbon 56 forward, and causing it to buckle longitudinally so that transverse cut 70, but means of its trailing edge 92, is held squarely against inner side 182 of knife 156. Then the forward movement of reciprocating head 24 stops, and knife 156 moves to its third position below the ribbon pathway 64 sweeping past stationary knife 154 and making a complete cut across the ribbon 56 at the point of transverse cut 70. Label 54 is then cut from the leading edge of ribbon 56. This final position of knife 156 is shown in FIG. 12 of the drawings in which the longitudinal buckle of ribbon 56 may be seen most pronounced at the arrow at reference numeral 185.

I have illustrated and described the bowing means 180 and 184 at the end of the ribbon pathway as being inclined. However, they may comprise any kind of construction which will coerce the ribbon to bow upwardly. For example, the central portion of the bowing means designated by reference numeral 184 may be any type of upwardly disposed protuberance. Also the edge portions 180 may be downwardly disposed protuberances of any type. These portions of the bowing or coercing means might be in the form of an upwardly disposed wheel or downwardly disposed wheels, or the bowing means might be in the form of a slot in the shape of an upward bow in which the central part of the ribbon 56 would ride in the middle or top of the slot and the edges of the ribbon would ride through the edges of the slot.

I have found that a knife blade 156 having an edge 158 with a V shape coming substantially to a point 159 will work better than a knife having a straight cutting edge 158 since the point 159, when placed centrally with relation to the ribbon 56, will engage the ribbon properly and will engage and hold the trailing edge 92 of transverse cut 70 securely. I prefer to use a knife 156 with such a V shaped blade coming to a dull or rounded point 159. However, I have found that a blade with a plain straight edge 158, or one with a projection similar to projection 208 (FIGS. 13 and 14) to engage the ribbon, will perform satisfactorily.

After the label 54 is cut, it will be held temporarily in a label tray 186 beneath springs 188. Then a gripper (not shown) will pick up the cut label 54 by grasping it within slot 189, and move it to the next position of the labeling operation of the labeling machinery. The gripper and the next portion of the operation are now shown or described since such grippers and methods of operation are well known in the art, and are not a part of this invention. The label tray 186 together with the springs 188 and slot 189 are shown herein by way of illustration only to illustrate one form of delivering the cut label 54. There are other forms of delivery which may be used. For example, the cut label may be grasped by a sucker, gripper or other means at the point of cutting and moved away without the necessity of having a label tray 186 or hopper.

In FIGS. 13 and 14 of the drawings, I show an alternate form of my invention in which the cutting means is in the form of a die set 190 rather than a knife means 152. The die means 190 may be used to cut labels having rounded or bevelled corners or other desirable shapes at the end.

The feeding mechanism is the same as that shown in FIG. 1 of the drawings, the only difference being that instead of having a knife making the cut, the cut is made by a die set 190 having a male moving portion 192 and female stationary portions 194 in which the trailing end of the label 54 being cut and the leading end of the next label 54 still on the ribbon 56 are shaped simultaneously.

By using this die method, the leading and trailing ends of the labels may be made in different shapes in accordance with the configuration of the die.

The die is moved from the first or upper position to the second or intermediate position and then to the third or cutting position by the same means as are used to move the moving blade of the cutting knife. Since the die moves perpendicularly toward the ribbon 56, it is necessary to supply a linkage comprising a fork 200 or equivalent means with a yoke 202 fitting a roller 203 mounted on a pin 204 coming out of the die 192. The trailing cutting edge 210 of the die 192 would be located in the plane otherwise occupied by the edge 158 of the moving knife blade 156.

In order to facilitate engagement between a transverse cut 70 of the ribbon 56 and the trailing edge 210 of the die 192 when the die 192 is in intermediate position, I have provided a small part 208 which would depend from the trailing cutting edge 210 of the male die 192 in a central position which would engage the transverse cut 70 without doing any cutting. The rear surface of part 208 which is in the same plane as the die trailing cutting edge 210 will act as an engaging extension to engage the trailing edge 92 of the transverse cut 70. This engaging part 208 would be an extension of the bottom of the die for this engagement purpose. It could either be made integrally with the die or as a separate part which could be fastened by a screw or other means in order to simplify the manufacture of the die.

In FIGS. 17 and 18 of the drawings, I show another form of the invention which comprises a knife cutting means. In this form of the invention, the knife 256 is located on the reciprocating head 224 and reciprocates back and forth with the reciprocating head. In addition, the jaws 238 and 282 act as a clamp to securely grip the ribbon 56 during the forward part of the reciprocating feed cycle. The first, or lower, jaw of this form of the invention, jaw 282, has a clamping surface provided with a substantially convex portion 240 and the second or upper jaw 238 has a complementary facing surface 241 being non-planar, or in this case, concave and complementary to a portion of convex portion 240. The leading end of jaw 238 is spaced somewhat behind the leading end of jaw 282 so that when the jaws are closed, there will be a space between knife edge 258 and leading end of jaw 238 to permit jaw 238 to move upwardly and downwardly with relation to jaw 282 without hitting knife blade 256. This space also serves another purpose. The convex portion 240 of the lower jaw 282 is bevelled backwardly at its front end so that the top of the bevel 243 is in line with front end of the upper jaw 238. This provides room for the leading edge 90 of transverse cut 70 to bow downwardly when the knife edge 258, at point 259, slides into engagement with the ribbon 56 in the manner as described hereinbelow.

Knife blade 256 is mounted on reciprocating head 224 by being keyed to keyway 260 in shaft 222, and maintained in place on head 224 by means of a bracket 262. Thus, knife 256 is a moving knife which is operated by the rotation of shaft 222 through a keyway 260 in the shaft and a key 260 on the knife. In all other respects, knife 256 is operated from a first position above the ribbon pathway to an intermediate position to a third position below the ribbon pathway by means of a cam, cam follower and bracket arrangement identical to that shown in the form of the invention shown in FIG. 1 of the drawings, with the cam arranged with the proper dwells to cause the knife to be in first position above the ribbon pathway when the reciprocating head is moving in the rearward part of its cycle, then to cause the knife 256 to move to the second or intermediate position as the reciprocating head 224 almost reaches the rearmost part of its cycle, and then to cause the knife to sweep past front end of jaw 282, which serves as a stationary knife edge, when the reciprocating head 224 is at its foremost position. Starting position for the form of the invention shown in FIGS. 17 and 18 of the drawings would be an intermediate position on the return or reverse cycle of reciprocating head 224. At starting position, link 242 would be travelling rearwardly in a direction opposite to arrow F. Rocker arm 234 would be pulled rearwardly against stop pin 212 causing the reciprocating head 224 to move rearwardly. Label ribbon 56 would be held stationary in ribbon pathway 264 by brake means 220 acting against a stationary part such as a floor 221 in the ribbon pathway 264.

It is necessary to provide bowing means within the ribbon pathway 264 just behind the rearmost position of lower jaw 282 since the ribbon should be bowed upwardly to enable the knife edge 258 at point 259, when in second or intermediate position, to seek and properly engage the traling edge 92 of transverse cut 70. This is best done when trailing edge 92 is in an upwardly bowed position. I accomplish this with bowing means 270 and 271 which are placed on the ribbon pathway 264 in front of the brake means 220 and just behind the rearmost position of the jaws. In using the terms "in front of" and "behind," we are referring to the relative positions of these parts with reference to the ribbon pathway 264 as illustrated in FIG. 18 of the drawings. The bowing means 270 and 271 act to coerce the ribbon transversely by bowing it upwardly in much the same manner as bowing means 180 and 184 previously described; bowing means 270 acting to push the center part of the ribbon 56 upwardly, and bowing means part 271 acting at the edges of the ribbon 56 to maintain the edges at the normal plane of ribbon pathway 264.

Lower jaw 258 also has a ribbon guide 276 attached to it to prevent the leading end of ribbon 56 from falling below the plane of the ribbon pathway 264. The cam 262 controls the knife 256 so that the blade 258 will start to descend from its first position above the ribbon pathway to its second position which, in this form of the invention, is between the summit of the substantially convex portion 240 of lower jaw 282 and the normal plane of the ribbon pathway 264, just before the reciprocating head 224 reaches its rearmost position. It is understood that the first or lower jaw 282 is below ribbon pathway 264. However, the convex portion 240 extends up into the ribbon pathway. Because of this and the cooperation of bowing means 270 and 271, the ribbon 56 will be caused to bow upwardly. At the same time, point 259 will engage the ribbon 56 and coerce the leading edge 90 of the transverse cut 70 to bow downwardly. At this point, reciprocating head 224 will have almost reached its rearmost position. Ribbon 56 will be bowed upwardly in contacting relationship over convex portion 240 with trailing edge 92 of transverse cut 70 bowed upwardly and leading edge 90 bowed downwardly immediately in front of convex portion 240 by means of pressure of point 259. With ribbon 56 bowed transversely as just described (also similar to bowed transverse cut in FIG. 16), reciprocating head 224 continues rearwardly to its rearmost position which is approximately 1/32 of an inch shorter in distance from brake 220 than that portion of ribbon 56 between brake 220 and knife edge point 259, causing ribbon 56 to buckle longitudinally as indicated at reference numeral 225 as shown in FIG. 18 of the drawings. Immediately thereafter, link 242 will reverse and move in the direction of arrow F pushing rocker arm 234 forward and moving jaw 238 downwardly toward jaw 282 until the jaws clamp together with ribbon 56 between them. That part of FIG. 18 shown in solid line shows this condition, e.g. where the knife has engaged the upward bow of the ribbon during the last part of the reverse motion of the link 242 and where the initial forward motion of the link 242 has proceeded just far enough to cause the jaws to clamp the ribbon, but not far enough to start feeding the ribbon forward.

Thus, ribbon 56 will be clamped with transverse cut 70 in secure registration against knife edge 258. At the point of clamping of the jaws 238 and 282, further rocking motion of rocker arm 234 will cease, causing further forward motion of link 242 to move reciprocating head 224 toward its forward position on the forward part of the reciprocating cycle. FIG. 17 shows this condition where the reciprocating head has moved forward feeding the ribbon far enough to eliminate the longitudinal buckle.

At this point, knife edge 258 is still in the second intermediate position between the summit of convex portion 240 and the lateral ends of convex portion 240. When reciprocating head 224 reaches its most forward position, the mechanism of the device is adjusted to move knife edge 258 to its third position below the ribbon pathway causing it to complete its sweep past front end of jaw 282 to completely sever a label from the end of label ribbon 56 exactly in registration with transverse cut 70. Continued rotation of the main drive of the device causes link 242 to reverse, opening jaws 238 and 282, pulling rocker arm 234 back against stop pin 212 to move reciprocating head 224 back again on its reverse cycle toward starting position at the middle of the reverse cycle. While the jaws were opening, the cam 262 caused the knife edge 258 to return to its first position above the ribbon pathway 264.

That part of FIG. 18 shown in phantom shows the condition where a label has just been cut and the jaw 238 and knife 256 have moved upwardly preparatory to the reciprocating head starting its reverse motion.

The mechanism is now at starting position and ready to repeat the cycle over and over again, cutting off a label in exact registration with a transverse cut 70 during each cycle. In this form of the invention as shown in FIGS. 17 and 18 of the drawings, registration is made by the cooperation of knife edge 258 engaging the ribbon 56 at a transverse cut 70 and buckling it longitudinally against the brake 220 which holds the ribbon 56 against a ribbon pathway guide 221 which is positioned on the main frame of the device in the vicinity of the brake 220.

In FIGS. 19 and 20 of the drawings, I illustrate another form of my invention in which the cutting means is a knife 356 mounted on reciprocating head 324. This form of the invention differs from the form illustrated in FIGS. 17 and 18 in that the knife is mounted behind the trailing edge 383 of lower jaw 382 whereas in the form of invention shown in FIGS. 17 and 18, the knife 256 is mounted in front of the leading edge or end of jaw 282. Another point of difference is that the jaws 338 and 382 are in spaced facing relationship when closed as shown at reference numeral 307 similar to space 107 as shown in the form of invention described in FIG. 1 of the drawings. In this third form of the invention, the knife 356 has an edge 358 with an engaging point 359. There is a guide 376 to keep the leading end of ribbon 56 from falling below the ribbon pathway 364. The lower jaw 382 has a substantially convex portion 340 on its upper surface, with a bevelled portion 345 at its trailing edge, and upper jaw 338 has a complementary non-planar portion 343 on its lower surface facing convex portion 340. Trailing edge 383 of the lower jaw 382 is bevelled at point 345 to provide room for the knife point 359 to coerce downwardly a portion of ribbon 56 just behind a trailing edge 92 of a transverse cut 70 as will be more fully described hereinbelow. Trailing edge 383 of jaw 382 serves as stationary knife for the edge 358 of moving knife blade 356. Knife blade 356 is mounted on reciprocating head 324 in a similar manner as blade 256 is mounted on head 224 with a similar keying arrangement, and is held in place by bracket 362.

Starting position of the reciprocating head in this form of the invention is at the rearmost position of the reciprocating head where rocker arm 334 is back against stop pin 312. Link 342 then moves in a forward position in the direction of arrow F causing rocker arm 334 to move forward towards stop pin 310. This causes top jaw 338 to move toward jaw 382 to closed position in spaced facing relationship when rocker arm 334 hits stop pin 310. The action of closing of jaws 338 and 382 in spaced facing relationship confines (but does not clamp) ribbon 56 between the said jaws in an upwardly bowed position.

At this point, continued motion of link 342 in a forward position against stop pin 310 causes head 324 to move forward, moving bevelled portion 345 up to a transverse cut 70 in the ribbon 56. At the same time, knife 356 which was at first position above the ribbon pathway 364 when the reciprocating head 324 was at its rearmost position, is moved to second position with the point 359 of knife edge 358 below the summit of convex portion 340 and above the lateral ends of convex portion 340 thereby seeking to coerce the ribbon 56 downwardly at a point, as aforesaid, just behind a transverse cut 70. Bevelled portion 345 permits knife point 359 to reverse the bow of trailing edge 92 of transverse cut 70 (by coercing it into a downwardly bowed position), while leading edge 90 remains in its upwardly bowed position, without damaging the ribbon 56. Ribbon 56 is held between brake 320 and ribbon path floor 321 and remains momentarily stationary as the jaws, together with knife point 359 (in second position) move forward. Then the leading edge 90 of transverse cut 70 is engaged by the knife edge 358 and point 359. Before, during and after this engagement, the leading edge 90 of the transverse cut 70 is held in an upwardly bowed position by the confining faced surfaces of the jaws. Continued forward movement of the head 324, after knife edge 358 engages transverse cut 70, feeds the ribbon 56 forward by pulling the ribbon forward against the action of the brake means 320. The force of the brake means is sufficient to hold the ribbon motionless as it is confined in bowed position between the jaws 338 and 382, but it is insufficient to hold the ribbon against the direct pull by reason of engagement of the knife edge 358 against leading edge 90 of transverse cut 70 of the ribbon 56. The bowed portion of transverse cut 70 at this point is illustrated in FIG. 21 of the drawings.

Link 342 continues to move reciprocating head 324 forward until it reaches its most forward position at which point the cam 362 causes knife 356 to move to the third position below the ribbon pathway accomplishing a cut of label 54 from the end of label ribbon 56. Label 54 is then delivered to the wrapping or labeling machine in any manner known to the art.

The act of the knife edge 358 in seeking and finding cut 70 as described hereinabove achieves exact registration of the cut since the knife continues to pull the ribbon against the action of the brake 320 until the actual point of cutting, maintaining the knife edge 358 in exact registration with the leading edge of transverse cut 70. After the cut is made, the knife moves up again to first position and the jaws 338 and 382 move to a relatively open position as link 342 reverses and pulls rocker arm 334 back until it hits stop pin 312 causing the link 342 to pull the entire reciprocating head 324 back to its rearmost position on the reverse cycle which is coincident with starting position.

The mechanism is then in a position to continue to recycle, cutting a label 54 in exact registration with a transverse cut 70 on each cycle. The complementary portion 343 of upper jaw 338, being shorter than the opposite convex portion 340 of lower jaw 382, also insures that the upper jaw 338 does not interfere with the cutting action of the knife 356.

This is illustrated in FIG. 22 of the drawings which shows the relationship between lower jaw 382 and upper jaw 338 and knife 356 when they are in the open position.

I have also provided a spring wire 385 attached behind the trailing edge 383 of the lower jaw 382 to support the ribbon 56 in the ribbon pathway 364 after a label 54 is cut, so as to insure that ribbon 56 will not drop below the ribbon pathway 364 and be fouled by lower jaw 382 on its next rearward move.

In FIGS. 23 through 29 of the drawings, I show another form of the invention in which the active longitudinal coercing means for the ribbon 56 is incorporated in the knife 456.

I have provided this form of the invention for applications where exceptionally high speeds of operation are required. In this form, there are at least two factors which permit the machinery to run at much higher speeds without sacrificing cutting quality and the exact registration of the cut.

The first of these factors is that the leading end of ribbon 56 is kept in an upwardly transverse bow for the length of the ribbon between the rearmost position of the jaws 438 and 482 and the cutting knife 456. This bowed conformation of the ribbon 56 constitutes the approximation of the lateral surface of a cylindrical wedge and imparts greater rigidity and strength to the ribbon 56, permitting faster acceleration without deformation or destruction of the ribbon 56.

A second factor which permits increasing the speed is that a large portion of the cycle of operation is available for cutting. The jaws 438 and 482 bring the transverse cut 70 to the knife position to be severed, and then start rearwardly to pick up another transverse cut 70. After the jaws clear the knife 456, the knife has the remaining part of the cycle during which the jaws are moving rearwardly to make its cut.

In this form of the invention, variation of spacing between transverse cuts 70 as a result of manufacturing tolerances is entirely eliminated as a factor to be compensated for at the cutting station since the transverse cut 70 can be fed exactly to a position in register with the cutting edge 458 of the knife 456. However, there is a tendency in the ribbon 56 to "spring back." This may result from any number of causes, principal among which is the fact that the ribbon is "curled" to some extent due to having been wound on a reel. The amount of spring back is not predictable to the extent that it can be compensated for by a fixed adjustment in the feeding mechanism of the device. Thus, while the transverse cut 70 may be fed exactly to a position in register with the cutting means, due to the phenomenon of spring back just described the transverse cut 70 will move out of such exact registration when the jaws of the feeding device are disengaged from the ribbon 56 and moved back.

In order to place the transverse cut 70 to a position of registration with the knife edge 458, I adjust the feeding mechanism to overfeed the ribbon a small fraction of an inch, and I have also provided camming means 459 associated with the knife 456 to engage the ribbon 56 at a transverse cut 70 to cam it into registration, as will be more fully described hereinbelow.

This coercive camming feature, including overfeed and camming back, will also compensate for minor errors in adjustment of the mechanism.

In this form of the device, the ribbon 56 is fed intermittently. A feed drive such as that shown in FIG. 1 of this specification may be used, except that the drive (not completely shown) for the form of the invention of FIGS. 23 through 29 is turned upside down. Except for the changes as shown in FIGS. 23 through 29, the drive is generally the same as an upside-down version of FIG. 1; but since the knife moves from an upper to a lower position without stopping, the cam in the drive mechanism for the knife 456 need not have an intermediate dwell similar to dwell 166 as shown in FIG. 7 of the drawings, and the cam is timed for the knife 456 to cut at the proper part of the cycle.

The feed, registration and cutting are accomplished as follows: jaws 438 and 482 (as seen in FIG. 24) start the cycle in their rearmost position while knife 456 is at its first position above the ribbon pathway 464. Link 442 moves forward causing jaw 438 to move upwardly toward jaw 482 until rocker arm 434 hits stop pin 410. Jaw 438 is split medially to form a slot 439 adapted to fit around ribbon support 480 which is positioned centrally at the end 465 of the ribbon pathway 464. The upper surfaces of jaw 438, at both sides of the slot 439, are formed together in a substantially convex shape and the opposing lower surface of jaw 482 is concave. The jaws are shaped similarly to jaws 38 and 82 so that when they are together (as in FIG. 25) a space 408 (similar to space 108) is formed. Thus, the jaws 438 and 482 are adapted to engage a ribbon 56 at a transverse cut 70 so as to cause the leading edge 90 of transverse cut 70 to bow upwardly, and to confine the ribbon 56 forward of the leading edge 90 in an upwardly bowed position resembling the lateral surface of a cylindrical wedge.

Stop pin 410 permits this close confinement without clamping by maintaining space 407 between the jaws 438 and 482. The space 408 is provided (as was space 108) to provide for a tolerance variation in the spacing of transverse cuts 70. Continued forward movement of link 442 causes head 424 to move forward and feed the ribbon 56 when shoulder 483 abuts or engages leading edge 90 of ribbon transverse cut 70.

The ribbon 56 is shown in FIG. 24 just prior to this abutting engagement at the starting phase of the operation cycle with transverse cut 70 about to be engaged. After engagement, the ribbon 56 feeds forward with the head 424 and jaws until the jaws reach their most forward position in the ribbon pathway 464 as shown in FIG. 25 of the drawings. During this forward movement, the ribbon 56 between the jaws and the end 465 of ribbon pathway 464 is bowed upwardly. This is accomplished in space 407 between the jaws 438 and 482, as aforesaid, and also by bowing means located at the forward end of the ribbon pathway 464, comprising a central ribbon support 480, and side guides 481, formed on either side of the ribbon pathway 464, at the normal plane of the ribbon pathway 464. Central ribbon support 480 extends above the side guides 481 and cooperates with them to form upward bowing means. Upper end 485 of ribbon support 480 has a radius curve about pivot axis 487, the radius being the distance between corner 489 and the axis of pivot pin 487. Ribbon support 480 may be adjusted by turning thumbscrew 493 against the action of spring 491. Thus, corner 489 may be adjusted forwardly or rearwardly with relation to the end 465 of the ribbon pathway 464, with which the knife cutting edge 458 is in register. The reason for this adjustment will become apparent as we continue.

Provision must be made to permit upper end of ribbon support 480 to be displaced out of the ribbon pathway 464 when the jaws 438 and 482 are in their most forward position because lower end of shoulder 483, carrying a downwardly bowed portion of ribbon 56 below and behind it, would otherwise interfere with upper end of ribbon support 480. I have, therefore, provided slotted bearings 455 in that part of the main frame which supports the pivot pin 487 so that pivot pin 487, together with ribbon support 480, may move downwardly out of the way of lower part of shoulder 483 and trailing edge of transverse cut 70. Spring 491 also serves to maintain ribbon support 480 in its normally upward position when not displaced downwardly by shoulder 483. This is accomplished by spring 491 maintaining pivot pin 487 at the upper extremities of slotted bearings 455 except when being cammed downwardly by shoulder 483 of upper jaw 482.

The drive is adjusted so that when the ribbon 56 comes to rest (as in FIG. 25), the transverse cut 70 to be registered with the knife edge 458 will protrude a small fraction of an inch from the end 465 of ribbon pathway 464. The cutting is done by knife edge 458 and the act of the knife 456 in sweeping from a first position above the ribbon pathway 464 to a second position within the ribbon pathway 464 accomplishes both final registration and cutting because of the particular construction of the knife 456 of this form of the invention, as follows:

I have provided a coercing camming means 457 which may either be attached to the knife by screws, rivets or other fasteners, or which may be formed integrally with the knife edge 458 (as shown in FIGS. 23 through 28) at the time of making the knife. Knife edge 458 is preferably of V shape and sweeps past a pair of stationary knife elements 460, located at the end 465 of the ribbon pathway 464, to complete each cut of the ribbon 56 by completing each transverse cut 70. Centrally located on edge 458 is the camming means 457 with a cam face 459 which leads edge 458 of knife 456 as the knife sweeps to make its cut. The position of transverse cut 70, after the feeding of ribbon 56 has stopped and the jaws have opened and the ribbon 56 has "sprung back," should always be a few thousandths of an inch beyond the end 465 of the ribbon pathway 464. While the amount of "spring back" is variable and unpredictable, it should normally be within the range of a small fraction of an inch. Thus, it is necessary to overfeed the ribbon 56 a sufficient distance so that after "spring back" takes place, the end of the ribbon will have come back to a given area within the range of a few thousandths of an inch in front of the end 465 of the ribbon pathway 464 as shown in FIG. 26 of the drawings, and as will be more fully described hereinbelow.

In order that transverse cut 70 may come to rest at a settling point between the end of ribbon pathway 465 and corner 489 of ribbon support 480, support corner 489 must be adjusted to extend from the end 465 of the ribbon pathway a distance slightly more forward than the most forward settling point of transverse cut 70, after spring back.

Coercing cam means 457 comprises an impinging tip 461 to engage the ribbon 56 forward of transverse cut 70. The position of corner 489, after adjustment, is inside of or rearwardly of impinging tip 461, so that when knife 456 sweeps downwardly, corner 489, as well as transverse cut 70, will be between impinging tip 461 and end 465 of ribbon pathway 464 and, therefore, beneath cam surface 459. Thus, transverse cut 70 will appear beneath cam surface 459 so that when the drive of the device moves knife 456 downwardly, tip 461 of the coercing cam 457 will coerce ribbon 56 downwardly just before leading edge 90 of transverse cut 70.

This will expose corner 489 to cam surface 459 which will continue in its downward move to engage corner 489 and then trailing edge 92 of transverse cut 70 to cam them rearwardly. The corner 489 is cammed rearwardly against action of spring 491 so as not to interfere with the cutting action of the knitfe, and the radius curve 485 provides, during this rearward camming action, for continuous upward support for ribbon 56 at the end 465 of ribbon pathway 464. The curve 485 also serves as a guide when initially threading the ribbon 56.

The upwardly bowed trailing edge 92 is cammed rearwardly against a stationary element in the ribbon pathway 464 such as the brake means 421 causing ribbon 56 to buckle longitudinally between cam face 459 and brake 421, said buckling maintaining transverse cut 70 and knife edge 458 of knife 456 in exact registration in the same manner as in the other forms of the invention described hereinabove, as the knife 456 continues in its downward sweep.

The impinging and camming action is shown in one of its phases in FIG. 27 of the drawings.

When the knife is again returned to first position above the ribbon pathway 464, action of spring 491 will again push corner 489 forwardly, against thumb screw 493 which acts as a stop.

During the time that the jaws 438 and 482 are in their most forward position, as shown in FIG. 25 of the drawings, top end of guide support 480 with its radius curve 485 which would normally be in the way, is displaced downwardly by the camming action of lower end of shoulder 483 which engages radius curve 485 which, at this point, is within slot 439 of lower jaw 438. The ribbon 56 is not affected by the described camming action since the part of the ribbon forward of shoulder 483 is bowed upwardly and will not be touched, and the part of the ribbon rearward of shoulder 483 is bowed downwardly and is held in close contact against lower substantially concave surface 493 of upper jaw 482, and will not be affected by the single camming action described hereinabove.

FIG. 25 shows the phase of the operating cycle when the jaws are in their most forward position. The feeding and cutting cycle continues by link 442 now moving rearwardly on the return portion of its cycle, moving rocker arm 434 back causing jaw 438 to lower until rocker arm 434 hits stop pin 412 at which time the entire head 424 will move in a rearward direction, moving back with jaws 438 and 482 to return to their first or starting position at the extreme rear part of the feeding cycle. It is when the jaws open that "spring back" of the ribbon 56 occurs. When the jaws clear end 465 of ribbon pathway 464, the knife has its opportunity to achieve registration and cut, as set forth hereinabove, and the knife has the entire part of the rearward cycle, after the jaws have cleared the end of the ribbon pathway 464, to operate. Action of the knife, which has already been partially described hereinabove, consists of a downward sweeping movement from its first position above the ribbon pathway 464 past the ribbon 56 causing the ribbon 56 to buckle as aforesaid to maintain register of partial transverse cut 70 with the knife edge 458. Then knife edge 458 passes stationary knife elements 460 to complete the cut. The position of the elements at the completion of a cut is shown in FIG. 28 of the drawings, which is at a phase of the operating cycle just before starting position as shown in FIG. 23.

The device is timed so that the knife 456 will return to its first or starting position at some time before the jaws again engage the ribbon 56 to move it forward.

Reference to FIG. 23 will show that knife edge 458 is in the form of a shallow V with impinging point 461 centrally located. Impinging point 461, as well as cam surface 459 of the coercing cam means 457, must be lower than the cutting edge 458 since the cam surface 459 must intersect the vertical plane of the cutting edge 458 at a position low enough to insure that the transverse cut 70 of the ribbon 56 will be completely cammed back into register before the cutting edge 458 starts to cut the ribbon 56. The same would be true if coercing cam means 457 were installed on a knife, or a cutting die, as a separate element similar to the projection 208 shown in FIGS. 13 and 14. In other words, the coercing element must insure that transverse cut 70 will be cammed into register before the cutting edge makes its cut so that the label 54 may be severed in exact registration with transverse cut 70. A label 54 is shown in FIG. 28 just after severing.

The form of the invention shown in FIGS. 23 through 28 has been described in its preferred form with jaws 438 and 482 providing for confinement of ribbon 56 in an upwardly bowed position resembling the lateral surface of a cylindrical wedge within space 407 forward of shoulder 483. This same confined bowed position of the ribbon can be accomplished, in this form of the invention, without the upper jaw 482 having a facing non-planar complementary surface to convex surface 499 to form space 407.

The side guides 481 in this form of the invention are channel shaped. The channels form an upper confining surface 484 and a lower confining surface 486. The distance between surfaces 484 and 486 is only slightly greater than the thickness of the ribbon 56 and, therefore, the surfaces 484 and 486 act to confine the edges 72 and 74 of the ribbon 56, so that ribbon 56 will be bowed upwardly by upward movement of convex upper surface 499 of jaw 438. Convex upper surface 499 will come up between guides 481 to move the ribbon 56 upwardly against the downward restraining force of surfaces 484 thereby bowing the ribbon 56 into an upwardly bowed shape resembling the lateral surface of a cylindrical wedge. Thus, in this form of the invention, upper jaw 482 could very well end at shoulder 483 and needs nothing forward of the said shoulder 483. In the same manner, the action of convex surface 493 of upper jaw 482 bows trailing edge of the ribbon 56 downwardly against the restraining forces of guide surfaces 486.

In FIG. 29 of the drawings, an upper jaw 482a is shown which may be substituted for upper jaw 482 of FIG. 24. The difference, as indicated hereinabove, is that the upper jaw 482a has nothing forward of shoulder 483a. Shoulder 483a serves the same purpose as shoulder 483 of upper jaw 482, and lower convex surface 493a serves the same purpose as lower convex surface 493 of upper jaw 482. Thus, in this form of the invention, either jaw 482 as shown in FIG. 24 may be used or a jaw 482a as shown in FIG. 29 may be used in place thereof.

In all forms of the invention, the exact registration of cutting means to a cut in a ribbon is achieved by a form of ribbon coercing means.

In the forms of invention described as shown in FIGS. 1 and FIGS. 17, 18 and 24, the registration is accomplished by buckling the ribbon 56 either between the knife and a reciprocating head or between a knife and a braking means.

In the form of invention as shown in FIGS. 19 through 22, the registration is accomplished by the opposite of buckling, namely by making the ribbon 56 taut longitudinally between the engaging edge of a knife and the restraining force of a brake.

In the form of invention shown in FIGS. 30 to 38, the registration is accomplished by coercing the ribbon 502 between the ribbon engaging means such as stud 504 and the brake 506. This is shown as a rearward buckling as indicated by the arrow in FIG. 35, or by a forward coercing as shown by the arrow in FIG. 38, as will be more fully explained hereinbelow.

In the form of invention shown in FIG. 30, and the related figures, the ribbon of labels 502 has a series of portions which may be cut into cut labels 508 separated by a registration portion 510. Each registration portion 510 contains one or more cuts or perforations 512 which act as a part of the registration means of the device. Although one perforation 512 will act as a satisfactory registration means, I prefer to use several perforations, and in the preferred form of the device illustrated in the drawings, there are three such perforations 512 distributed transversely across the ribbon 502.

The registration portion 510 of the ribbon may in some of the drawings, such as FIG. 33, be defined by transverse lines 514 and 516. These lines 514 and 516 are imaginary lines and represent the portions of the ribbon where cuts will be made by the cutting means 520. Cutting means 520 is provided with spaced cutting edges 522 and 524 which would cut along imaginary lines 514 and 516 respectively. It is understood that the registration portion 510 of the ribbon 502 is made as short as possible in its preferred form with lines 514 and 516 being as close to the perforations 512 as the operation of the device will permit in order to waste a minimum amount of paper. Registration portion 510 is eliminated from the ribbon 502 during the cutting operation and is waste unless, of course, it can be put to some other use as a by-product of the operation.

The device of FIG. 30 has a feeding head 530. Feeding head 530 is mounted on rods 532 and 534, and is driven off the main drive of the device by crank 536 and drive link 538 in a similar manner to that described hereinabove for the form of device illustrated in FIG. 1. The cam 540 in the driving mechanism for the cutting means 520 will have a single dwell 542 which will be timed for the cutting means 520 to cut at the proper part of the cycle.

The device of FIG. 30 has at least one movable jaw 544 having at least one stud or ribbon engaging means 504 adapted to engage perforations 512 of the ribbon. If there are three perforations 512 in the registration portion 510 in the ribbon, there should ideally be three studs 504 in the movable jaw 544 adapted to enter and engage at least a portion of the edge of each of said perforations 512. It is to be understood, however, that jaw 544 need not have as many studs as there are perforations 512 in the ribbon so long as there is at least one stud in the jaw which will engage one of the perforations 512. Each stud 504 is adapted to be received into a recess, hole, or other stud receiving means 546 in a lower jaw 548 so that when the upper jaw 544 is moved to closed position, the ribbon 502 will be held between the jaws 544 and 548 on the ribbon pathway 550 with the studs 504 extending through the perforations 512 and in the holes 546. The holes or recesses 546 may also be in the form of longitudinal slots just underneath the ribbon pathway into which the studs 504 may enter when jaw 544 is moved toward the ribbon pathway 550.

Cutting means 520 has a pair of spaced cutting edges 522 and 524 which will move with relation to stationary cutting edges 552 and 554 to achieve a double cut of the ribbon 502 thereby severing a label 508 and removing a registration portion 510. The double spaced edges 522 and 524 and their stationary counterparts 552 and 554, in their preferred form, comprise a die having a male die member 556 and female die members 558. However, these cutting means 520 may be in the form of twin knives or any other arrangement which will provide spaced cuts to cut off both a label 508 and a registration portion 510. The spaced cutting edges 524 and 522 may be straight and parallel to provide labels 508 having square cut ends, or these cutting edges may be varied as suggested by FIGS. 39, 40 and 41 of the drawings, especially where a die cutting means is used, to provide labels having variously formed ends which may be according to a regular or irregular type of pattern. For example, a die such as that shown in FIG. 39 will provide a label having internally curved edges coming to two points. The die of FIG. 40 will provide a label having straight edges with curved corners, and the die in FIG. 41 will provide a label having curly edges, each of the aforesaid types of dies being adapted to cut out a registration portion such as portion 510.

The feed, registration and cutting of the device of FIG. 30 are accomplished as follows: Jaw 544 (as seen in FIG. 34) starts its cycle in its rearmost and open position while die 556 is at its first position above the ribbon pathway 550. Link 538 moves forward causing jaw 544 to move toward ribbon path 550. Ribbon 502 has been threaded into the mechanism and lies at rest with perforations 512 arranged with rear edge 513 slightly forward of rear camming surface 505 of stud 504, "slightly forward" being a relative term to be applied to elements 513 and 505 when stud 504 on jaw 544 would be in closed position as shown in FIG. 35.

Returning now to FIG. 34, link 538 moves forward in the direction of the arrow causing jaw 544 together with stud 504 and camming surface 505 to move toward ribbon pathway 550 and ribbon 502. Stud 504 will enter perforation 512, and camming surface 505 will engage rear edge 513 to cause the ribbon 502 to be coerced and buckled rearwardly in the direction of the arrow as shown in FIG. 35 when jaw 544 is closed against jaw 548 at the ribbon pathway 550. It is at this point of closure that the ribbon 502 has been coerced and buckled to achieve registration with stud 504. Since there is no forward stop pin on head 530, the jaws 544 and 548 will assume a clamping engagement on the ribbon 502 thereby keeping the registration thus achieved during the subsequent movements of the feed cycle. Continued forward movement of link 538 causes feed head 530 to move forward and feed the ribbon 502 in a forward direction until head 530 comes to rest. Link 538 stops its forward movement at the forward portion of the feed cycle, thus bringing ribbon 502 to rest.

Cutting means 520 has been placed at a cutting station spaced a distance away from the most forward position of stud 504 so that registration portion 510 of ribbon 502 will be within spaced cutting edges 522 and 524. This distance will be either one length of ribbon between centers of perforations 512, or any multiple thereof suitable within the structure of the device. Cutting means 520 may then operate at any time during which the ribbon is at rest to sever label 508 and remove registration portion 510.

The ribbon 502 will be at rest during that part of the feed cycle after jaw 544 reaches its most forward position as shown in FIG. 36, during the time when jaw 544 is opened and returning to starting position, and until stud 504 again engages a perforation 512. The action of cutting means 520 is determined by dwell 542 in cam 540, and is preferably timed to make its cut from first position to second position across the ribbon path 550 as soon after the ribbon 502 comes to rest as possible. It is not absolutely necessary for ribbon 502 to come to a complete rest just so long as the cut is made while registration portion 510 is within the paths or pathways defined by the spaced cutting edges 522 and 524 when these edges cross the ribbon pathway 550. Cutting means 520 is then returned to first position ready to make another cut at the proper time.

While it is preferred, in this form of the device, to have the jaw 544 reach its most forward position at some distance behind the cutting station, the jaw 544 may, nevertheless, be fed into the cutting station with the cutting members temporarily retracted and place the registration portion 510 of the ribbon 502 directly at the point of cutting. This construction would require that the cut be timed to be made after the jaw 544 starts its return and clears the cutting station.

Cutting means 520 is operated in a manner similar to the die shown in FIGS. 13 and 14 of the drawings, having a yoked arm 564 keyed to shaft 534 which is rotated by action of the cam 540. Yoked arm 564 engages a pin 566 in the cutting means 520 to move it from first to second position.

The device as shown in FIG. 30 has been described in its preferred form and in its preferred operation. Registration may also be achieved between the ribbon 502 and stud 504 by a forward coercing as illustrated in FIGS. 37 and 38 of the drawings. This is accomplished by providing the stud 504 with a forward camming edge 503 adapted to engage forward edge 511 of perforation 512. In this type of operation, the ribbon 502 is initially threaded into the device and fed so that edge 511 will be slightly to the rear of engaging cam 503. Then, when jaw 544 is moved toward ribbon pathway 550, the ribbon 502 will be coerced forwardly with relation to the brake 506 in the direction of the arrow as illustrated in FIG. 38. The forward coercion of the ribbon to achieve registration may be used where small light rolls of ribbon labels are fed through the device.

For normal sized rolls the brake friction required is much higher and might result in tearing the ribbon 502 and, therefore, the rearward coercion or buckling as illustrated in FIGS. 34 and 35 is preferred.

Adjustment of the device for the rearward buckling is accomplished as follows.

It is to be understood that once the first feed cycle of the device is accomplished, by reason of the fact that the perforations 512 are spaced a substantially equal distance apart, the next feeding cycle will find a perforation 512 at the proper starting position slightly forward of stud 504, ready to be coerced into registration. Positioning of perforations 512 as aforesaid is accomplished by adjusting the relative position of the feed head and jaws by adjusting the length of the crank arm 536 and the length of the link 538. Thus, in this form of the device, the ribbon is coerced into registration by means of registration means contained within a registration portion of the label ribbon, and the registration portion 510 is then fed to a cutting station which includes the cutting means 520 with the spaced cutting edges 522 and 524 which define spaced paths across the ribbon path from a first position to a second position to effectively cut off the label 508 and the registration portion 510.

The form of invention as shown in FIG. 30 may be adapted to operate at much faster rates of speed by providing a pair of feed heads side by side adapted to operate out of phase so that when one feed head is pushing the ribbon forward, the other may be returning; and while the second feed head would be pushing the ribbon forward, the first one could be returning. Reference to FIG. 33 and FIG. 42 of the drawings will show a pair of feed jaws 584 and 586 (which would be mounted on separate independent heads 530a and 530b similar to head 530 and driven by separate connecting means off the main drive of the device). There are also a pair of brake means or ribbon holding means 588 and 590. Feed jaw 584 has a stud similar to stud 504 beneath it adapted to fit into perforation 512R and jaw 586 has a stud similar to stud 504 beneath it adapted to fit into perforation 512L. Feed jaws 584 and 586 operate in exactly the same manner as feed jaw 544, but are placed on either side of the ribbon pathway in such a manner that they will not interfere with each other during their out-of-phase motion.

Heads 530a and 530b for jaws 584 and 586 are cantilever mounted on rods such as rods 532 and 534, side by side, right and left hand, in close proximity to each other without interference. Each jaw 584 and 586 can be driven from the main drive of the device by separate proper drive links such as links 538a and 538b. The links 538a and 538b are driven respectively by cranks 536a and 536b. Crank 536a is driven off the main drive of the device by shaft 546a as described in the forms of invention set forth hereinabove, and crank 536b is connected in a one to one ratio to shaft 546a by means of bevels 515 and 517, a shaft 519 and bevels 521 and 523 as shown in FIG. 42 of the drawings. The cutter operating cam 540a is similar in action to cam 540 as shown in FIG. 30 of the drawings except that it will have two dwells 542a and 542b to be timed to cause cutting means 520a to make a cutting motion when ribbon 502 is at rest between forward pushes by the jaws 584 and 586. Thus, the jaws 584 and 586 will alternate in registering a stud 504 against a perforation 512 and pushing the ribbon 502 forward to the cutting station 520, thus providing two feed mechanisms in place of one and enabling the device to feed at twice the speed. The alternating action of jaws 584 and 586 is illustrated in FIG. 33 of the drawings. Where jaws 584 and 586 are shown in solid lines at a forward and rearward position respectively, the same jaws are then shown in dotted lines at rearward and forward positions respectively.

In order to prevent the ribbon being biased sideways when an off-center perforation such as perforation 512R is engaged, the single brake mechanism 506 has been replaced by a pair of brakes 588 and 590 so that when the rearward buckling and forward pull is on the right side of the ribbon, the braking force will be exerted on the right side of the ribbon in line with the coercing force, and similarly, when the rearward buckling and forward pull is on the left hand side of the ribbon, the braking force will be exerted on the left hand side of the ribbon.

The action of the brakes 588 and 590 must be timed to exert their braking or ribbon holding force at the times when the jaws 584 and 586 are coercing the ribbon 502 as aforesaid. This is accomplished by cams 587 and 592 operated by shafts 585 and 593 (driven off the main drive in proper timing). Cams 587 and 592 lift lips 589 and 591 to release brakes 588 and 590 respectively. Cam 592 is driven in a one to one ratio off main shaft 546a by means of bevels 525 and 527, shaft 529, bevels 531 and 533 and shaft 593. Cam 587 is driven in a one to one ratio to the main drive of the device by means of bevel 535 on shaft 546b, bevel 537, shaft 539, bevels 541 and 543 connecting to shaft 585 which in turn is connected to cam 587. The aforesaid drive connections for the cams 587 and 592 can be seen in FIGS. 33 and 42 of the drawings, it being understood that the cams are arranged to lift and release brakes 588 and 590 at the proper timing for the operation of the device as aforesaid.

Increasing the number of feed heads can also be provided with the form of invention shown in FIG. 1. This may be done by providing three partial transverse cuts in lateral arrangement and permitting a pair of side by side out-of-phase feed heads with jaws to do the feeding by engaging the outside cuts. In such case, the cutting edge of the cutting means would engage the center cut. This may also be done by providing a pair of partial transverse cuts for the side by side heads and permitting the cutting edge to make its registration with either of the laterally placed transverse cuts. Where side by side feeding is done, there must, of course, be a pair of side by side braking means as described hereinabove.

As an alternative, the single partial transverse cut 70 may be retained in the ribbon and two or more out-of-phase heads lined up longitudinally along the ribbon pathway may be used to feed the ribbon, as shown in the alternate form of device illustrated in FIG. 43 of the drawings. The form of device shown in FIG. 43 is substantially similar to that shown in FIG. 1 of the drawings. It has guide rods 20a and 22a on which are slideably mounted heads 24a and 24b. Each head is provided with a pair of jaws 38a and 82a and 38b and 82b respectively. These jaws are similar in operation to the jaws shown in FIGS. 1 and 2 of the drawings. The respective jaws and heads of the device as shown in FIG. 43 are driven off the main drive by means of links 42a and 42b adapted to operate out of phase by action of cranks 44a and 44b respectively. Crank 44a is driven off the main drive of the device and is connected to crank 44b by means of a pair of gears 45 in a one to one ratio. The cranks 44a and 44b are adjusted to be out of phase so that when link 42a is at its foremost position, link 42b will be at its rearmost position. Thus, the jaws 38a, 82a and 38b, 82b will alternate in engaging the ribbon at a partial transverse cut 70 to achieve registration and provide two feed mechanisms in the place of one, enabling the device to feed at twice the speed. In this form of the device, there is also a ribbon holding means 120a.

In all other respects, the device will operate similar to that shown in FIGS. 1 and 2 of the drawings with the exception that cam 162a as shown in FIG. 43 will have a pair of dwells 170a and 170b of equal depth 180 degrees apart so that the cutting mechanism of the device can make two cuts for each revolution of the main drive instead of one cut. This cutting mechanism is not specifically illustrated in FIG. 43, but may be of the same type shown in FIGS. 1 and 2.

Any of the above methods may be used with a single transverse cut such as cut 70, said cut being engaged by a right hand head at the right hand portion of the cut and by a left hand head at a left hand portion of the cut and by the knife in the usual manner.

Thus, in all forms of the invention described herein, the device may be speeded up by providing a plurality of feeding heads to be used in conjunction with a single cutting station.

While I have described my invention in its preferred forms, there are many forms which it may take without departing from the spirit and scope of the invention. For example, while I have described this invention as a mechanical registration means, many features of it may be used in conjuntcion with an electronic registration device. The spaced cutting means of the invention may be used to sever any kind of registration marks including electric or electronic ones. The term "non-planar," when used in conjunction with a ribbon engaging means or jaw, is meant to include a jaw having a projection which would, in effect, produce the same function as the non-planar surface described herein. Also I have described registration means throughout this application including partial transverse cuts, perforations or cuts. It is intended that the term "perforation" as used herein shall include any type of cut, whether straight or curved, completely circular or elliptical, or whether made in any manner or form whatsoever, providing such cut, when placed in a ribbon of labels, will provide an engaging edge which may be engaged by the feeding and registration mechanism of the device. I, therefore, desire to be protected for all forms of the invention coming within the claims hereinbelow.

Wherefore I claim:

1. A label feeding and cutting device for a ribbon of labels, having registration cut means between labels, having a main frame and comprising: a ribbon path for a ribbon, at least one reciprocating head mounted on the said main frame comprising ribbon engaging means, said ribbon engaging means having facing ribbon engaging portions, with a facing surface of a first ribbon engaging portion being non-planar, a facing surface of a second ribbon engaging portion having a non-planar surface portion complementary to at least a portion of the said facing engaging surface of the said first mentioned ribbon engaging portion, cutting means associated with said ribbon path, said cutting means comprising a pair of spaced moving edges and means to move the said moving edges from a first position completely outside the said ribbon path to a second position completely outside the said ribbon path, said ribbon path being between said first and second positions, said ribbon engaging means being adapted to engage at least one registration cut means between said labels, and feed said ribbon of labels to said cutting means with the registration cut means, between the label to be severed and the next succeeding label, positioned between said spaced moving edges.

2. A label feeding and cutting device as defined in claim 1, in which at least one of the said ribbon engaging portions comprises a shoulder.

3. A label feeding and cutting device for a ribbon of labels, having registration cut means between labels, having a main frame and comprising: a ribbon path for a ribbon, at least one pair of jaws reciprocally mounted on said main frame, said pair of jaws having facing portions with the facing surface of a first jaw being partly substantially concave and partly substantially convex, and the facing surface of a second jaw having a non-planar surface portion, said non-planar surface portion being complementary to at least a portion of the said facing surface of the said first mentioned jaw, cutting means associated with said ribbon path, said cutting means comprising a pair of spaced moving edges and means to move the said moving edges from a first position completely outside the said ribbon path to a second position completely outside the said ribbon path, said ribbon path being between said first and second positions, said jaws being adapted to engage at least one registration cut means between said labels, and feed said ribbon of labels to said cutting means with the registration cut means, between the label to be severed and the next succeeding label, positioned between said spaced moving edges.

4. A label feeding and cutting device as defined in claim 3, in which the said first mentioned jaw is provided with a shoulder between the said partly substantially concave and partly substantially convex portions of its surface.

5. A label feeding and cutting device as defined in claim 4, in which the said jaws move in a direction substantially parallel to the said ribbon path and are driven by the main drive means of the device, through connecting means.

6. The label feeding and cutting device as defined in claim 5, in which said jaws are mounted on a reciprocating head driven by the main drive means of the device through connecting means, said drive and connecting means for said jaws, and said drive and connecting means for said reciprocating head being coordinated in timed relationship so that the said jaws will be in a closed position during a forward portion of a cycle of the said reciprocating head, and in an open position during a return portion of a cycle of the said reciprocating head.

7. The label feeding and cutting device as defined in claim 5, in which at least one of the jaws is moved relative to the other jaw by the main drive of the device through the said connecting means to the reciprocating head, said drive to the said jaw comprising at least one stop mounted on the said reciprocating head so that the said jaws will be in a closed position during a forward portion of a cycle of the said reciprocating head, and in an open position during a return portion of a cycle of the said reciprocating head.

8. In a label feeding device comprising a main frame, in which labels are cut from a ribbon of labels, label cutting registration means comprising: a ribbon of labels with a series of registration portions comprising at least one perforation positioned on the ribbon between adjacent labels, a ribbon pathway, cutting means having spaced cutting edges adapted to move in spaced paths intersecting the said ribbon pathway to sever the ribbon, ribbon feed means comprising ribbon engaging means including ribbon coercing means adapted to engage the ribbon at at least one of the said perforations, said ribbon engaging means comprising at least one pair of jaws, said pair of jaws having surface portions with the facing surface of a first jaw being partly non-planar and the facing surface of a second jaw having a non-planar surface portion, said non-planar surface portion being substantially complementary to at least a portion of the said facing surface of the said first mentioned jaw; said ribbon engaging means being adapted to move from a first position along the ribbon pathway to a second position along the said ribbon pathway whereby, when the said ribbon engaging means has engaged the said ribbon at the said first position and moved the said ribbon to the said second position, at least one of said perforations will be between the paths made by the said spaced cutting edges of the said cutting means.

9. The label feeding device as defined in claim 8, in which at least one of said jaws comprises at least one stud having at least one camming surface, and the said perforation has at least one edge adapted to be engaged by the said stud.

10. The label feeding device as defined in claim 8, including ribbon holding means in the said ribbon pathway.

11. A label feeding device as defined in claim 8 in which at least one of the said jaws comprises a shoulder.

12. In a label feeding device comprising a main frame, in which labels are cut from a ribbon of labels, label cutting registration means comprising a ribbon of labels with at least one perforation positioned on the ribbon between the said labels, a ribbon pathway, ribbon feed means comprising at least one jaw, said jaw including at least one engaging stud comprising at least one camming surface; at least one engaging stud receiving means comprising recess means to receive the said stud of the said first mentioned jaw, cutting means having spaced cutting edges adapted to move from a first position to a second position with the said ribbon pathway between the said first and second positions, said spaced cutting edges defining pathways through the said ribbon path when moving from said first to said second positions, feed means adapted to move the said jaw from an open position to a closed position with respect to the engaging stud receiving means, ribbon holding means located on the said ribbon pathway and connecting means to the main drive of the device being coordinated and timed to move the said jaw to said closed position into engagement with the said ribbon when the said jaw is in a rearward position, then to move the said jaw to a forward position with the said ribbon, then to open the said jaw and move it to said rearward position, and to move the cutting means from said first to said second position during the portion of the feed cycle when the said ribbon is not moving forward, said ribbon of labels being positioned during the jaw closing phase of said feed cycle with an edge of the said perforation within the path of the said camming surface of the said engaging stud while the said jaw is closing.

13. In a label feeding device comprising a main frame, in which labels are cut from a ribbon of labels, label cutting registration means comprising a ribbon of labels with at least one perforation positioned on the ribbon between the said labels, a ribbon pathway, ribbon feed means comprising at least one pair of jaws, one of said jaws including at least one engaging stud comprising at least one camming surface, the second jaw of the said pair comprising recess means to receive the said stud of the said first mentioned jaw, cutting means having spaced cutting edges adapted to move from a first position to a second position with the said ribbon pathway between the said first and second positions, said spaced cutting edges defining pathways through the said ribbon path when moving from said first to said second positions, feed means adapted to move the said jaws from a rear open position to a forward closed position along the said ribbon pathway, ribbon holding means located on the said ribbon pathway and connecting means to the main drive of the device being coordinated and timed to close the said jaw into engagement with the said ribbon when in rearward position, then to move the said jaws to forward position with the said ribbon, then to open the said jaws and move them to rearward position, and to move the cutting means from first to second position during the portion of the feed cycle when the said ribbon is not moving forward, said ribbon of labels being positioned during the jaw closing phase of said feed cycle with an edge of the said perforation within the path of the said camming surface of the said engaging stud while the said jaws are closing.

14. In a label feeding device comprising a main frame, in which labels are cut from a ribbon of labels, label cutting registration means comprising a ribbon of labels with at least one perforation positioned on the ribbon between the said labels, at least one jaw comprising at least one ribbon engaging stud adapted to fit into engaging stud receiving means, said ribbon engaging stud having at least one camming surface adapted to engage and coerce at least one edge of the said perforation of the ribbon.

15. The label feeding device as defined in claim 14, which also comprises ribbon holding means.

16. The label feeding device as defined in claim 15, in which the said jaw and the said ribbon holding means are located on the ribbon pathway together with cutting means comprising spaced cutting edges, the space between said spaced cutting edges being at least as wide as the said perforation.

17. The label feeding device as defined in claim 16, in which the said jaw comprising the ribbon engaging stud is located along the ribbon path between the said ribbon holding means and the said cutting means and is adapted to move from a first position to a second position along the said ribbon path, and in which the said cutting means is spaced from the said jaws a distance, with relation to the said ribbon of labels, so that when the said jaw is in second position with the said ribbon engaging stud within a perforation in the said ribbon, another perforation in the said ribbon will be within the space between the said spaced cutting edges.

18. The label feeding and cutting device as defined in claim 5, including ribbon holding means in the said ribbon path.

19. In a label feeding device comprising a main frame, in which labels are cut from a ribbon of labels, label cutting registration means comprising: a ribbon of labels with a series of registration portions comprising at least one perforation positioned on the ribbon between adjacent labels, a ribbon pathway, cutting means having spaced cutting edges adapted to move in spaced paths intersecting the said ribbon pathway to sever the ribbon, ribbon feed means comprising at least one head with ribbon engaging means including ribbon coercing means adapted to engage the ribbon at at least one of the said perforations, said ribbon engaging means being adapted to move from a first position along the ribbon pathway to a second position along the said ribbon pathway whereby, when the said ribbon engaging means has engaged the said ribbon at the said first position and moved the said ribbon to the said second position, at least one of said perforations will be between the paths made by the said spaced cutting edges of the said cutting means; in which the said ribbon of labels comprises a plurality of perforations spaced laterally on the said ribbon between the said labels, and the said feed comprises a plurality of heads, each head having ribbon engaging means with at least one of said heads being positioned so that its engaging means will engage a perforation on one side of the said ribbon and at least one other of the said heads being positioned so that its engaging means will engage a perforation on the other side of the said ribbon, said heads being timed to operate out of phase.

20. The label feeding device as defined in claim 19, in which there are a plurality of ribbon holding means along the ribbon path.

21. In a label feeding device, comprising a main frame, in which successive labels are cut from a ribbon of labels, label cutting registration means comprising: a ribbon of labels separated by partial transverse cuts, reciprocating feed means comprising an element to engage at least one partial transverse cut of the said ribbon and means, associated with a cutting edge, mounted on the said main frame adapted to engage at least one partial transverse cut of the said ribbon different from the said first mentioned cut, said first mentioned cut being engaged by the said feed element on a forward portion of the cycle of the reciprocating feed of the device, and said second mentioned cut being engaged thereafter during the said forward portion of the cycle of the said reciprocating feed movement, so that both of the mentioned cuts are in engagement when said reciprocating feed means reaches its most forward position, with the length of ribbon between the said cuts being relatively greater than the distance between the said partial transverse cut engaging means thereby coercing the said ribbon to buckle longitudinally; in which the said partial transverse cuts comprise at least one partial transverse cut made laterally between the said labels in the said ribbon of labels, and in which the reciprocating feed means comprises a plurality of heads, each head comprising at least one element to engage at least one partial transverse cut of the said ribbon with at least one of the said heads being positioned so that its engaging means will engage a transverse cut nearer one side of the said ribbon, and at least one other of the said heads being positioned so that its engaging means will engage a transverse cut nearer the other side of the said ribbon, said heads being timed to operate out of phase.

22. The label feeding device as defined in claim 21 in which there are a plurality of ribbon holding means along the ribbon path.

23. In a label feeding device having a main frame including a ribbon path for a ribbon of labels, the combination comprising a ribbon having regularly spaced partial transverse cuts, means adapted to advance the said ribbon along the said ribbon path, ribbon bowing means comprising offset central and side portions adapted to bow the said ribbon transversely at at least one of the said transverse cuts, cutting means comprising at least one moving edge transverse to said ribbon path, coercing means having at least one surface with at least one element of said surface in the plane of motion of the said moving edge, means to move the said coercing surface from a first position completely outside the said ribbon path to a second position within the path of a bowed portion of the said ribbon, and means to move the said moving edge of the said cutting means from a first position completely outside the said ribbon path to a second position completely outside the said ribbon path, said ribbon path being between the said first and second positions of said moving edge; in which the said regularly spaced partial transverse cuts are between successive labels on the said ribbon of labels and comprise at least one partial transverse cut made laterally between the said labels in the said ribbon of labels, and in which the said means adapted to advance the said ribbon along the said ribbon path comprises a plurality of heads, each head comprising at least one element to engage at least one partial transverse cut of the said ribbon with at least one of the said heads being positioned so that its engaging means will engage a transverse cut nearer one side of the said ribbon, and at least one other of the said heads being positioned so that its engaging means will engage a transverse cut nearer the other side of the said ribbon, said heads being timed to operate out of phase.

24. The label feeding device as defined in claim 23, in which there are a plurality of ribbon holding means along the ribbon path.

25. In a label feeding device comprising a main frame, in which labels are cut from a ribbon of labels, label cutting registration means comprising: a ribbon of labels with a series of registration portions comprising at least one perforation positioned on the ribbon between adjacent labels, a ribbon pathway, cutting means having spaced cutting edges adapted to move in spaced paths intersecting the said ribbon pathway to sever the ribbon, ribbon feed means comprising at least one head with ribbon engaging means including ribbon coercing means adapted to engage the ribbon at at least one of the said perforations, said ribbon engaging means being adapted to move from a first position along the ribbon pathway to a second position along the said ribbon pathway whereby, when the said ribbon engaging means has engaged the said ribbon at the said first position and moved the said ribbon to the said second position, at least one of said perforations will be between the paths made by the said spaced cutting edges of the said cutting means; a plurality of heads positioned along the said ribbon pathway spaced apart longitudinally with relation to the said ribbon pathway, said heads being timed to operate out of phase.

26. In a label feeding device, comprising a main frame, in which successive labels are cut from a ribbon of labels, label cutting registration means comprising: a ribbon of labels separated by partial transverse cuts, reciprocating feed means comprising an element to engage at least one partial transverse cut of the said ribbon and means, associated with a cutting edge, mounted on the said main frame adapted to engage at least one partial transverse cut of the said ribbon different from the said first mentioned cut, said first mentioned cut being engaged by the said feed element on a forward portion of the cycle of the reciprocating feed of the device, and said second mentioned cut being engaged thereafter during the said forward portion of the cycle of the said reciprocating feed movement, so that both of the mentioned cuts are in engagement when said reciprocating feed means reaches its most forward position, with the length of ribbon between the said cuts being relatively greater than the distance between the said partial transverse cut engaging means thereby coercing the said ribbon to buckle longitudinally; in which the reciprocating feed means comprises a plurality of heads positioned along the said ribbon pathway spaced apart longitudinally with relation to the said ribbon pathway, said heads being timed to operate out of phase.

27. In a label feeding device having a main frame including a ribbon path for a ribbon of labels, the combination comprising a ribbon having regularly spaced partial transverse cuts, means adapted to advance the said ribbon along the said ribbon path, ribbon bowing means comprising offset central and side portions adapted to bow the said ribbon transversely at at least one of the said transverse cuts, cutting means comprising at least one moving edge transverse to said ribbon path, coercing means having at least one surface with at least one element of said surface in the plane of motion of the said moving edge, means to move the said coercing surface from a first position completely outside the said ribbon path to a second position within the path of a bowed portion of the said ribbon, and means to move the said moving edge of the said cutting means from a first position completely outside the said ribbon path to a second position completely outside the said ribbon path, said ribbon path being between the said first and second positions of said moving edge; in which the means adapted to advance the said ribbon along the said ribbon path comprises a plurality of heads positioned along the said ribbon pathway spaced apart longitudinally with relation to the said ribbon pathway, said heads being timed to operate out of phase.

28. A label feeding device for feeding a ribbon of labels, including means to obtain register for an operation to be performed with respect to such labels, said device having a main frame, a ribbon of labels partially separated by cuts, a ribbon path for said ribbon, ribbon engaging means to engage at least one of said cuts to move said ribbon longitudinally, ribbon holding means to hold said ribbon against movement longitudinally at said holding means, said engaging and said holding means coercing said ribbon to deform said ribbon between said engaging means and said holding means to obtain register with said operation to be performed.

29. The label feeding device as defined in claim 28, in which said ribbon engaging means is comprised in feed means, and said ribbon holding means is comprised in braking means.

30. The label feeding device as defined in claim 28, in which said ribbon engaging means is comprised in feed means, and said ribbon holding means is comprised in cutting means.

31. The label feeding device as defined in claim 28, in which said ribbon engaging means is comprised in cutting means, and said ribbon holding means is comprised in braking means.

32. The label feeding device as defined in claim 30, in which said feed means and said cutting means are adapted to bow the ribbon transversely at at least one of said transverse cuts.

33. The label feeding device as defined in claim 28, in which the said ribbon engaging means is adapted to bow the edges of at least one of said cuts in opposite directions.

34. The label feeding device as defined in claim 28, in which said ribbon engaging means comprises an element having a non-planar surface and a movable element adapted to contact the ribbon, with an edge of at least one of said cuts against a portion of the said ribbon engaging means.

35. A label feeding device for feeding a ribbon of labels, including means to obtain register for an operation to be performed with respect to such labels, said device having a main frame, a ribbon of labels partially separated by cuts, a ribbon path for said ribbon, ribbon engaging means to engage and move said ribbon longitudinally, ribbon holding means to engage at least one of said cuts to hold said ribbon against movement longitudinally at said holding means, said engaging and said holding means coercing said ribbon to deform said ribbon between said engaging means and said holding means to obtain register with said operation to be performed.

36. The label feeding device as defined in claim 35, in which said ribbon engaging means is adapted to move said ribbon longitudinally relative to said ribbon holding means, and in which said ribbon holding means comprises bowing means to deform the ribbon by bowing adjacent edges of at least one of said cuts in opposite directions so that at least one edge of said cut is adapted to be in engagement with said ribbon holding means.

37. The label feeding device as defined in claim 35, in which said ribbon holding means comprises an element having a non-planar surface and a movable element adapted to contact the ribbon, with an edge of at least one of said cuts against a portion of said ribbon holding means.

38. A label feeding device for feeding a ribbon of labels, including feeding means, holding means and means to obtain register for an opeartion to be performed with respect to such labels, said device having a main frame, a ribbon of labels having at least one partial transverse cut, means comprising at least one pair of jaws having facing non-planar substantially complementary surfaces adapted to slidably confine the said ribbon with at least a portion of one of said edge portions bowed in one direction and at least a portion of another edge portion bowed in an opposite direction to obtain register with said operation to be performed.

39. In a label feeding device, comprising a main frame, in which successive labels are cut from a ribbon of labels, label cutting registration means comprising: a ribbon of labels separated by partial transverse cuts, reciprocating feed means comprising an element to engage at least one partial transverse cut of the said ribbon and means, associated with a cutting edge, mounted on the said main frame adapted to engage at least one partial transverse cut of the said ribbon different from the said first mentioned cut, said first mentioned cut being engaged by the said feed element on a forward portion of the cycle of the reciprocating feed of the device, and said second mentioned cut being engaged thereafter during the said forward portion of the cycle of the said reciprocating feed movement, so that both of the mentioned cuts are in engagement when said reciprocating feed means reaches its most forward position, with the length of ribbon between the said cuts being relatively greater than the distance between the said partial transverse cut engaging means thereby coercing the said ribbon to buckle longitudinally.

40. In a label feeding device, comprising a main frame, in which successive labels are cut from a ribbon of labels, label cutting registration means comprising: a ribbon of labels separated by partial transverse cuts, reciprocating feed means associated with label cutting means, comprising a cutting edge, adapted to engage at least one partial transverse cut of the said ribbon, and ribbon holding means; said transverse cut being engaged by the said cutting means on a return portion of the cycle of the reciprocating feed of the device, while the said ribbon is held by the said ribbon holding means during the said return portion of the cycle of the said reciprocating feed movement, so that the mentioned transverse cut is in engagement with the said cutting means when said reciprocating feed means reaches its most rearward position, with the length of ribbon between the said point of engagement with the said cutting means and the said ribbon holding means being relatively greater than the distance between the said cutting means and the said ribbon holding means thereby coercing the said ribbon to buckle longitudinally.

41. In a label feeding device, comprising a main frame, in which successive labels are cut from a ribbon of labels, label cutting registration means comprising: a ribbon of labels separated by partial transverse cuts, reciprocating feed means associated with said label cutting means comprising a cutting edge adapted to engage at least one partial transverse cut of the said ribbon, and ribbon holding means, said cut being engaged by said cutting means on a forward portion of the cycle of the reciprocating feed of the device, while the forward movement of the said ribbon is coerced by said ribbon holding means during said forward portion of the feed cycle so that the length of ribbon between the said cutting means and the said ribbon holding means is taut and maintains the said partial cut against the said cutting edge in registration.

42. A label feeding device having a main frame and comprising: a ribbon path for a ribbon, at least one moving head mounted on said main frame comprising at least one pair of jaws, said pair of jaws having facing portions with the facing surface of a first jaw being partly substantially concave and partly substantially convex, and the facing surface of a second jaw having a non-planar surface portion, said non-planar surface portion being complementary to at least a portion of the said facing surface of the said first mentioned jaw, in which the said first mentioned jaw is provided with a shoulder between the said partly substantially concave and partly substantially convex portions of its surface, and in which the said moving head moves in a direction substantially parallel to the said ribbon path and is driven by the main drive means of the device, through connecting means, and in which there is cutting means associated with the said ribbon path, said cutting means comprising a moving edge and means to move the said moving edge from a first position completely outside the said ribbon path to a second position within the said ribbon path to a third position completely outside the said ribbon path, said ribbon path being between the first and third positions.

43. The label feeding device as defined in claim 42, including a ribbon holding means in the said ribbon path.

44. A label feeding device having a main frame and comprising: a ribbon path for a ribbon, at least one moving head mounted on said main frame comprising at least one pair of jaws, said pair of jaws having facing portions with the facing surface of a first jaw being partly substantially concave and partly substantially convex, and the facing surface of a second jaw having a non-planar surface portion, said non-planar surface portion being complementary to at least a portion of the said facing surface of the said first mentioned jaw, in which the said first mentioned jaw is provided with a shoulder between the said partly substantially concave and partly substantially convex portions of its surface, and in which the said moving head moves in a direction substantially parallel to the said ribbon path and is driven by the main drive means of the device, through connecting means, and in which there is cutting means associated with the said ribbon path, said cutting means comprising a moving edge and means to move the said moving edge from a first position completely outside the said ribbon path, to a second position completely outside the said ribbon path, said ribbon path being between said first and second positions.

45. The label feeding device as defined in claim 44, including a ribbon holding means in the said ribbon path.

46. A label feeding device having a main frame and comprising: a ribbon path for a ribbon, at least one reciprocating head mounted on said main frame comprising cutting means mounted on the said reciprocating head comprising a moving cutting edge, at least one pair of jaws, said pair of jaws having facing portions with the facing surface of a first jaw being partly substantially convex and the facing surface of a second jaw having a non-planar surface portion, said non-planar surface portion being complementary to at least a portion of the said facing surface of the said first mentioned jaw, in which the said reciprocating head moves in a direction substantially parallel to the said ribbon path and is driven by the main drive means of the device through connecting means, and in which at least one of the said jaws is moved relative to the other jaw by the main drive of the device through the said connecting means to the said reciprocating head, said drive to the said jaw comprising at least one stop mounted on the said reciprocating head so that the said jaws will be in a closed position during a forward portion of a cycle of the said reciprocating head, and in an open position during a return portion of a cycle of the said reciprocating head.

47. The label feeding device as defined in claim 46, including ribbon holding means in the said ribbon path.

48. A label feeding device having a main frame and comprising: a ribbon path including ribbon holding means and cutting means for a ribbon of labels, at least one pair of jaws mounted on reciprocating means, said reciprocating means being mounted on guide means substantially parallel to the said ribbon path, together with jaw operating means mounted on the said reciprocating means to move at least one of the said jaws from a first, relatively closed position within the said ribbon path to a second, relatively open position; a reciprocating link connected to the main drive of the device and to the said jaw operating means, stop means to limit the movement of the said jaw operating means within the reciprocating movement of the said reciprocating means positioned so that when the said reciprocating link moves in a forward direction with respect to the said ribbon path, the said jaws will be in the said first, closed position, and when the said reciprocating link moves in a return direction with respect to the said ribbon path, the said jaws will move to the said second, open position; said pair of jaws having facing portions, the surface of the said facing portion of one jaw being non-planar, and the surface of the said facing portion of the other jaw being non-planar and complementary to at least a portion of the said facing surface of the said first mentioned jaw.

49. A label feeding device having a main frame and comprising: a ribbon path, including ribbon holding means, for a ribbon of labels, at least one pair of jaws mounted on reciprocating means, said reciprocating means, including cutting means, being mounted on guide means substantially parallel to the said ribbon path; together with jaw operating means mounted on the said reciprocating means to move at least one of the said jaws from a first, relatively closed position within the said ribbon path to a second, relatively open position; a reciprocating link connected to the main drive of the device and to the said jaw operating means, stop means to limit the movement of the said jaw operating means within the reciprocating movement of the said reciprocating means positioned so that when the said reciprocating link moves in a forward direction with respect to the said ribbon path, the said jaws will be in the said first, closed position, and when the said reciprocating link moves in a return direction with respect to the said ribbon path, the said jaws will move to the said second, open position; said pair of jaws having facing portions, the surface of the said facing portion of one jaw being non-planar, and the surface of the said facing portion of the other jaw being non-planar and complementary to at least a portion of the said facing surface of the said first mentioned jaw.

50. In a label feeding device having a main frame including a ribbon path for a ribbon of labels, the combination comprising a ribbon having regularly spaced partial transverse cuts, means adapted to advance the said ribbon along the said ribbon path, ribbon bowing means comprising offset central and side portions adapted to bow the said ribbon transversely at at least one of the said transverse cuts, cutting means comprising at least one moving edge transverse to said ribbon path, coercing means having at least one surface with at least one element of said surface in the plane of motion of the said moving edge, means to move the said coercing surface from a first position completely outside the said ribbon path to a second position within the path of a bowed portion of the said ribbon, and means to move the said moving edge of the said cutting means from a first position completely outside the said ribbon path to a second position completely outside of the said ribbon path, said ribbon path being between the said first and second positions of said moving edge.

51. A label feeding device as defined in claim 50, in which the said cutting means comprises a moving knife, and a stationary knife attached to the main frame of the device, and the said moving edge is a cutting edge of the said moving knife.

52. The label feeding device as defined in claim 51, in which the coercing surface is on a projection extending from the said cutting edge of the said moving knife.

53. The label feeding device as defined in claim 51, in which the cutting edge of the said moving knife is in the form of a V.

54. The label feeding device as defined in claim 50, in which said cutting means is a die set comprising at least one stationary die mounted on the device and at least one moving die, and in which the said moving edge is a cutting edge of the said moving die.

55. The label feeding device as defined in claim 54, in which the coercing surface is on a projection extending from the said cutting edge of the said moving die.

56. In a label handling device comprising a main frame, in which successive labels are cut from a ribbon of labels, label cutting registration means comprising: a ribbon of labels separated by partial transverse cuts, feed operating means comprising engaging means to engage at least one partial transverse cut of said ribbon and camming means, associated with a cutting edge, adapted to engage the identical transverse cut engaged by the said feed operating means, said first mentioned engagement being accomplished during a phase of the operation of the feed of the device, and said second mentioned engagement being accomplished thereafter during a later phase of the operation of the feed means of the device, ribbon holding means adapted to hold the ribbon during the said second engagement, said camming means associated with the said cutting edge having a camming surface adapted to cam the said ribbon between the said camming means and the said ribbon holding means, thereby coercing the ribbon to buckle longitudinally.

57. The label handling device as defined in claim 56, in which the said feed operating means engaging means is associated with at least one pair of spaced facing ribbon confining means having in cross section, a bowed configuration and being adapted to confine and bow the ribbon at least during the said phase of operation of the feed of the device when the said first mentioned engagement is being accomplished.

58. The label handling device as defined in claim 57, in which the cutting edge operates at a cutting station, and there is a bowing means including offset side and central ribbon supports to maintain the ribbon in a bowed condition at the said cutting station.

59. The device as defined in claim 58, in which the said camming means includes an impinging point adapted to contact the said ribbon during the said second engagement to move the ribbon, at the point of impingement, in a direction opposite to the bow of the ribbon.

60. In a device for handling a ribbon having spaced partial transverse cuts, a ribbon path, feed means to advance the said ribbon along the said ribbon path, bowing means adapted to bow the said ribbon transversely, buckling means adapted to buckle the said ribbon longitudinally, and cutting means comprising registration means to engage at least one edge of a partial transverse cut to complete the said partial cut to sever a portion of the said ribbon in register with the said edge.

References Cited

UNITED STATES PATENTS 2,725,101  11/1955  Von Hofe _____ 83—278 X
3,174,371  3/1965   Macomber _____ 83—86

ANDREW R. JUHASZ, *Primary Examiner.*

U.S. Cl. X.R.

83—215, 268, 278, 602; 226—68, 163

PO-1050
(5/69)

UNITED STATES PATENT OFFICE
CERTIFICATE OF CORRECTION

Patent No. 3,435,717      Dated April 1, 1969

Inventor(s) James Keith Macomber

It is certified that error appears in the above-identified patent and that said Letters Patent are hereby corrected as shown below:

Column 7, line 47, "96" should read --94--. Column 12, line 10, "but" should read --by--; line 17, "edge" should read --end--; line 53, "now" should read --not--. Column 14, line 32, "258" should read --282--. Column 19, line 52, "knitfe" should read --knife--. Column 24, line 33, "for jaws 584 and 586" should read --for jaws 586 and 584--; line 34, "532" should read --532a--; line 38, "links 538a and 538b" should read --links 538b and 538a--. Column 32, line 18, "opeartion" should read --operation--; line 24, "one of said edge portions" should read --one edge of said transverse cut--; line 25, "another edge portion" should read --a second edge of said transverse cut--.

In the drawings, Sheet 1, Fig. 1, the lead line for reference numeral 150 should be shown going to the slot in the crank 44 rather than to the edge of the crank 44.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents